(12) United States Patent
Shibuya et al.

(10) Patent No.: US 9,779,495 B2
(45) Date of Patent: Oct. 3, 2017

(54) ANOMALY DIAGNOSIS METHOD AND APPARATUS

(71) Applicant: Hitachi, Ltd., Chiyoda-ku, Tokyo (JP)

(72) Inventors: Hisae Shibuya, Tokyo (JP); Shunji Maeda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 171 days.

(21) Appl. No.: 14/761,748

(22) PCT Filed: Jan. 15, 2014

(86) PCT No.: PCT/JP2014/050547
§ 371 (c)(1),
(2) Date: Jul. 17, 2015

(87) PCT Pub. No.: WO2014/115615
PCT Pub. Date: Jul. 31, 2014

(65) Prior Publication Data
US 2015/0363925 A1    Dec. 17, 2015

(30) Foreign Application Priority Data

Jan. 22, 2013   (JP) .................. 2013-009316

(51) Int. Cl.
*G06T 11/20*       (2006.01)
*G06T 7/00*        (2017.01)
(Continued)

(52) U.S. Cl.
CPC ............ *G06T 7/001* (2013.01); *F01D 21/003* (2013.01); *F01D 21/14* (2013.01); *F01D 25/00* (2013.01);
(Continued)

(58) Field of Classification Search
CPC ...... G05B 23/021; G06F 17/10; G06N 99/005
See application file for complete search history.

(56) References Cited

U.S. PATENT DOCUMENTS

| 5,680,409 A | 10/1997 | Qin et al. |
| 6,952,662 B2 | 10/2005 | Wegerich et al. |
| 2012/0290879 A1 | 11/2012 | Shibuya et al. |

FOREIGN PATENT DOCUMENTS

| JP | 11-510898 A | 9/1999 |
| JP | 2004-213273 A | 7/2004 |

(Continued)

OTHER PUBLICATIONS

International Search Report (PCT/ISA/210) dated Feb. 10, 2014 with English-language translation (four (4) pages).

*Primary Examiner* — Peter Hoang
(74) *Attorney, Agent, or Firm* — Crowell & Moring LLP

(57) ABSTRACT

To sensing an anomaly on the basis of a multi-dimensional time series sensor signal, in order to determine the next action for a countermeasure, survey, or the like, the present invention is configured such that a multi-dimensional feature vector for each time is extracted on the basis of a sensor signal, a reference feature vector for each time is extracted on the basis of a set of characteristic vectors for a predetermined learning period and the characteristic vector of each time, an anomaly measure is calculated on the basis of the difference between the feature vectors for the times and the reference feature vectors, an anomaly is detected by comparing the anomaly measure and a predetermined threshold value, and the anomaly-related sensor for the time the anomaly is detected is identified on the basis of a 2-dimensional distribution density of feature values.

13 Claims, 22 Drawing Sheets

(51) Int. Cl.

| | |
|---|---|
| *G05B 23/02* | (2006.01) |
| *F01D 25/00* | (2006.01) |
| *G01M 15/14* | (2006.01) |
| *G06K 9/46* | (2006.01) |
| *G06K 9/52* | (2006.01) |
| *G06K 9/62* | (2006.01) |
| *F01D 21/00* | (2006.01) |
| *F01D 21/14* | (2006.01) |

(52) U.S. Cl.
CPC ......... *G01M 15/14* (2013.01); *G05B 23/0235* (2013.01); *G06K 9/46* (2013.01); *G06K 9/52* (2013.01); *G06K 9/627* (2013.01); *G06K 9/6215* (2013.01); *G06K 9/6267* (2013.01); *G06K 9/6272* (2013.01); *G06T 11/206* (2013.01); *F05D 2260/80* (2013.01); *F05D 2270/708* (2013.01); *G06K 2009/4666* (2013.01); *Y02T 50/671* (2013.01)

(56) References Cited

FOREIGN PATENT DOCUMENTS

| | | |
|---|---|---|
| JP | 2011-70635 A | 4/2011 |
| JP | 2012-9064 A | 1/2012 |
| JP | 2012-138044 A | 7/2012 |
| JP | 2013-143009 A | 7/2013 |
| WO | WO 2012/090937 A1 | 7/2012 |

FIG. 4

| date | sensor 1 | sensor 2 | sensor 3 | sensor 4 | sensor 5 | ... |
|---|---|---|---|---|---|---|
| 2007.01.01 0:00:00 | 27935 | 478 | 179.9 | 14.6 | 1.18 | ... |
| 2007.01.01 0:00:30 | 27935 | 478 | 179.8 | 14.6 | 1.17 | ... |
| ⋮ | ⋮ | ⋮ | ⋮ | ⋮ | ⋮ | ... |

FIG. 15

| select | number | lerning period | | test period | | selected sensor number | parameter | threshold value | number of abnormal section |
|---|---|---|---|---|---|---|---|---|---|
| | | start | end | start | end | | | | |
| ☐ | 1 | 09/5/1 | 09/5/31 | 09/6/1 | 09/8/30 | 1, 2, 3, 4, 5, 6 | number of neighborhood=10<br>regularization=10e-4<br>cross validation=1G/1day<br>threshold value ratio=1.0 | 6.9 | 68 |
| ☐ | 2 | 09/5/1 | 09/5/31 | 09/6/1 | 09/8/30 | 1, 2, 3, 5, 6 | number of neighborhood=10<br>regularization=10e-4<br>cross validation=1G/1day<br>threshold value ratio=1.0 | 0.9 | 79 |
| ☑ | 3 | 09/5/1 | 09/5/31 | 09/6/1 | 09/6/30 | 2, 3, 5, 6 | number of neighborhood=10<br>regularization=10e-4<br>cross validation=1G/1day<br>threshold value ratio=1.0 | 0.5 | 55 |
| ☐ | 4 | 09/5/1 | 09/5/15 | 09/5/16 | 09/6/30 | 2, 3, 5, 6 | number of neighborhood=10<br>regularization=10e-4<br>cross validation=1G/1day<br>threshold value ratio=1.0 | 1.0 | 52 | detail    resister    back

FIG. 17 display period 2009.06.01 ~ 2009.06.30

| date | code | message |
|---|---|---|
| 2010/2/14 17:13:38 | 1231 | Request module on |
| 2010/2/14 17:17:25 | 1249 | Starter on |
| 2010/2/14 17:17:29 | 3225 | Ignition on |
| 2010/2/14 17:17:48 | 1250 | Starter off |
| 2010/2/14 17:17:52 | 2124 | Idle |
| 2010/2/14 17:17:53 | 2136 | Speed setpoint input - internal (DIA.NE) |
| 2010/2/14 17:18:00 | 1233 | Operation on |
| 2010/2/14 17:20:53 | 1256 | Acknowledgement |
| 2010/2/14 17:21:59 | 1234 | Operation off |

ANOMALY DIAGNOSIS METHOD AND APPARATUS

BACKGROUND

The present invention related anomaly diagnostic method and their equipment detecting an anomaly early based on a multi-dimensional time series data be output by anomaly sensors, such as plant and equipment, and identifying the sensors related to the detected anomaly.

In power companies, it provides hot water for district heating by utilizing such as waste heat of a gas turbine and provides high-pressure steam and low pressure steam for factories. Petrochemical companies are driving such as gas turbines as power supply equipment. Thus in various plant and equipment using such a gas turbine, the anomaly detection for detecting a malfunction or signs of the equipment is very important to minimize the damage to society.

Not only the gas turbine and steam turbine, water turbine in hydroelectric power plants, nuclear reactors of nuclear power plants, wind power plants of wind turbines, aircraft and heavy equipment engines, railway vehicle and track, escalators, elevators, even in equipment and component level, such as deterioration and life of the installed battery, equipment that require preventive maintenance, such as described above too numerous to mention.

Therefore, the relevant equipment and plant have been carried out to be mounted a plurality of sensors and to be determined whether normal or abnormal in accordance with the monitor criteria of each sensor. U.S. Pat. No. 6,952,662 (Patent Document 1) discloses method for calculating the similarity between observation data and past learning data in a unique way, calculating estimated value by linear combination of the data which are weighted according to the degree of similarity and detecting an anomaly based on the out degree of the observed data. Further, JP 2011-70635 (Patent Document 2) discloses that, in the anomaly detection method for detecting the presence or absence of anomaly based on the anomaly measure calculated by comparison with models created from past normal data, the normal state model is made by Local Subspace Classifier.

However, because the following actions such as measures and studies cannot be determined only by detecting the anomaly, there are needs to diagnose which sensor is associated to anomaly.

As a technology corresponding to these needs, Japanese Patent (Patent Document 3) No. 2012-138044 discloses process state monitor apparatus detecting an anomaly on the basis of the statistics $T^2$ and Q statistic calculated from a plurality of measured variables, and, after the detection, enumerating abnormal factor candidate based on the contribution of each measurement variable for these statistics.

CITATION LIST

Patent Literature

Patent Document 1: U.S. Pat. No. 6,952,662
Patent Document 2: JP 2011-70635
Patent Document 3: JP 2012-138044

SUMMARY

In the method for determining whether normal or abnormal in accordance with the monitor criteria of each sensor, a sensor exceeding the monitoring criteria is a sensor associated to anomaly, in this method, there is a problem that anomaly as a combination of two or more sensor signals cannot be detected.

According to the method described in Patent Document 1 and Patent Document 2, by providing the data of normal as learning data, the data not in the learning data is observed; it is possible to detect them as abnormal. For calculating together a plurality of sensor signals, anomaly as a combination of the sensor signals can be detected. However, there is no description about how to correctly diagnose the sensors associated with anomaly the anomaly.

According to the method described in Patent Document 3, by regarding a plurality of measurement items of $T^2$ statistic and Q statistic as indexes of abnormal, anomaly can also be detected as a combination of two or more sensor signals. It is possible to diagnose the sensors associated with anomaly based on the contribution of each measurement item for the statistics. However, anomaly detection using $T^2$ statistic and Q statistic as indexes, when applied in some facilities and plant frequently and irregularly switching operation and stop, and switching operating conditions, gives many false alarms, so it is difficult to apply such facilities. Local Subspace Classifier described in Patent Document 2, by collecting the learning data comprehensively, it is possible to suppress false alarms even in cases such as described above.

However, when a method of diagnosing the sensors associated with anomaly based on the contribution amount described in Patent Document 2, is applied to the anomaly detection method described in Patent Document 1, there is a case of not suppressing false alarms. The reason for this is easily described. Local Subspace Classifier, as shown in FIG. 2, regards projection distance to the Affine subspace to be made by the learning data (x1, x2, x3) near the observation data (q) as the index of the anomaly. In other words, as a reference foot (b) of a perpendicular line from the observed data (q) to the Affine subspace, the size of each element of the vector of q from b is the contribution amount. If there is an anomaly in a certain sensor signals, reference (b) may follow this anomaly and it may occur that the contribution of other sensors not related to the anomaly increase.

The simplified example is shown in FIG. 3A and FIG. 3B. In FIG. 3A, the normal data are distributed as shown in the three-dimensional sensor signals abc, when observation data changes as q→q'→q, reference data changes as b→b'→b. Shown in FIG. 3B expressed in the graph of time series, the contribution of a and b is large, but it is actually considered to c is related with anomaly, so an anomaly is incorrectly diagnosed. This is applied to not only a Local Subspace Classifier, but also to all methods of cases-based approach in which criteria varies with observation data, for example, a method such as ART2 based on the cluster and a technique called Similarity-Based Modeling as described in the method and Patent Document 1.

An object of the present invention is to solve the above problems, to provide an anomaly diagnosis method and apparatus for detecting an anomaly with high sensitivity based on multi-dimensional time series sensor signal and diagnosing the sensors associated to the detected anomaly correctly.

In order to solve the above problems, the present invention, in a method and apparatus for diagnosing an anomaly of a plurality of equipment or device based on the sensor signals output from the plurality of sensors mounted on the equipment or apparatus, obtains multi-dimensional feature vectors from the feature values of a plurality of sensor signals in the pre-specified learning period, extracts a multi-dimensional feature vector for each time from the feature values of a plurality of sensor signals at the time of diagnosis, calculates a reference feature vector for each time based on the set of the multi-dimensional feature vector obtained in the pre-specified learning period and on the multi-dimensional feature vector extracted at the each time of diagnosis, calculates the anomaly measure based on the difference between the multi-dimensional feature vector extracted at the each time and the reference feature vector for each time, detects an anomaly by comparing the calculated anomaly measure with a predetermined threshold, and identifies a sensor, from a plurality of sensors, relating to the detected anomalies based on the 2-dimensional distribution density of the feature values of a plurality of sensor signals in the time when anomaly was detected.

Furthermore, in order to solve the above problems, in the present invention including the method and apparatus for diagnosing an anomaly of the equipment comprising a step of creating and storing the learning data based on multiple sensor signals output from the plurality of sensors mounted on the equipment or apparatus and a step for performing anomaly diagnosis of the newly output a plurality of sensor signals from a plurality of sensors mounted the equipment or the apparatus, a step for creating and storing a learning data comprises;
a step of extracting a feature vector from a plurality of sensor signal, a step for storing the extracted feature vector as learning data, a step of for selecting a predetermined number of a feature vector from the learning data stored in accordance with the feature vectors in each of the stored feature vectors as learning data, a step for creating a reference vector for learning by using the selected predetermined number of the feature vectors, a step for calculating an anomaly measure in each of the feature vectors stored as learning data based on the created reference vectors for learning, a step for calculating a threshold value based on the calculated anomaly measure, and a step for calculating the 2-dimensional feature distribution density of all combinations from the feature vector, a step for performing of anomaly diagnosis of the sensor signal comprises;
a step for extracting feature vectors as observation vectors from a plurality of sensor signals output from the plurality of sensors mounted on the equipment or apparatus, a step for selecting a predetermined number of the feature vectors from the learning data stored in accordance with the extracted observation vector, the step for creating a reference vector for anomaly diagnosis using the predetermined number of the selected feature vector, a step for calculating the anomaly measure of observation vectors on the basis of the created reference vector for anomaly diagnosis, a step for determining whether the observation vector is abnormal or normal based on the calculated anomaly measure and the calculated threshold value calculated in the step for storing and creating the learning data, a step for identifying an anomaly-related sensor based on the observation vector at the time when a sensor signal corresponding to an observation vector determined to be abnormal in the step for determining is detected and the 2-dimensional feature distribution density.

Furthermore, in order to solve the above problems, in the present invention including a method and apparatus for diagnosing anomaly of an equipment and an apparatus comprising a step for creating and storing learning data based on the plurality of sensor signals output from the plurality of sensors mounted on the equipment or the apparatus and a step for performing anomaly diagnosis of a plurality of sensor signals newly output from a plurality of sensors mounted on the equipment or the apparatus;

the step for creating and storing learning data comprises;
a step for performing a mode division into different operating state based on the event signal output from the equipment or apparatus, a step for extracting feature vectors from a plurality of sensor signals, a step for storing the extracted feature vector as the learning data, a step for selecting a predetermined number of feature vectors from the learning data in accordance with each feature vector stored as learning data, a step for creating a reference vector for learning by using a predetermined number of the selected feature vectors, a step for calculating an anomaly measure of the feature vectors stored as learning data based on the created reference vector for learning, a step of calculating a threshold value for each mode based on the calculated anomaly measure, and a step for calculating the 2-dimensional feature distribution density of combinations for mode from the feature vectors stored as learning data, the step for performing anomaly diagnosis of a plurality of sensor signals comprises;
a step for extracting a feature vector as an observation vector from the plurality of signals output from the plurality of sensors mounted on the equipment or apparatus, a step for selecting a predetermined number of the feature vectors from among the learning data stored in accordance with the extracted observation vector, a step for creating a reference vector for anomaly diagnosis by using a predetermined number of the feature vector selected from among the learning data, a step for calculating the anomaly measure of observation vector based on the created reference vector for anomaly diagnosis, a step for determining whether the observation vector is abnormal or normal based on the calculated anomaly measure, divided mode and the threshold calculated for each divided mode, and a step for identifying anomaly-related sensors based on the observation vector at the time when the sensor signal corresponding to the observation vector determined to be abnormal in the step for determining is detected and the 2-dimensional feature distribution density calculated by each mode.

In accordance with the present invention, the anomaly detection data at each time, performing on the basis of the distance from the reference data calculated from the learning data and the data in that time, it is possible to detect anomaly with highly sensitivity. In identifying related sensor at the time when anomaly is detected, not directly regarding sensors having large contribution amount as related sensors, identifying the anomaly-related sensors based on the 2-dimensional distribution density of the sensor signals, it is possible to diagnose properly.

By the system of applying the above method, not only in the equipment, such as gas turbines and steam turbines, but also in water wheels of hydroelectric power plants, in nuclear reactors of nuclear power plants, in wind turbines of wind power plants, in the engine of aircraft and heavy machinery, and in railway vehicle track, escalators, elevators, and in various equipment and parts, for example, in equipment and in parts level, the deterioration and life of mounted batteries, etc., it is possible to carry out not only detecting anomaly of the subject, rapid investigation or measures in accordance with the related sensor.

BRIEF DESCRIPTION OF DRAWINGS

FIG. 4 is a table of the signal list showing an example of sensor signal.

FIG. 15 is a front view of a screen displaying a list of the test results for recipe setting.

FIG. 17 is an example of a display window periods included in result display screen.

DESCRIPTION OF THE PREFERRED EMBODIMENTS

This invention, in a method and apparatus for diagnosing an anomaly of equipment or apparatus based on a plurality of sensor signals output from the plurality of sensors mounted on the equipment or apparatus, extracts multi-dimensional feature vector for each time from the sensor signals, calculates the reference vector of each time based on the set of feature vectors of the pre-determined learning period and the feature vectors of each time, calculates anomaly measure on the basis of the difference between the feature vector of each time and the reference feature vectors, detects the anomaly by comparing the anomaly measure with a predetermined threshold, and identifies anomaly-related sensors based on the 2-dimensional distribution density of the feature value at the time when the anomaly is detected.

In the following, embodiments of the present invention will be described with figures.

Embodiment 1

Figure 1:
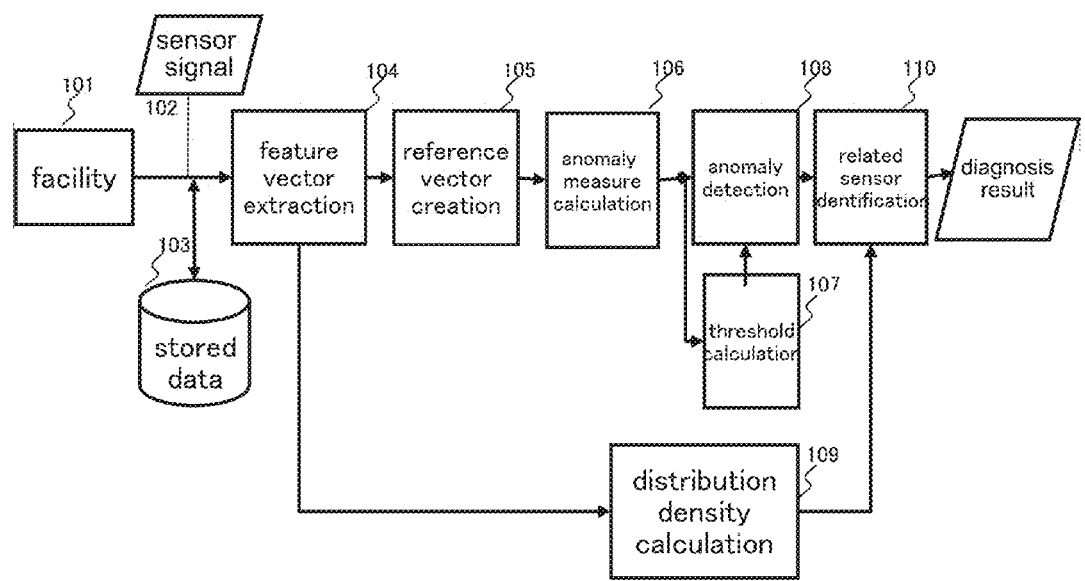
FIG. 1 is a block diagram showing a schematic configuration of equipment condition monitoring system for the first embodiment of the present invention.

The following will be described the contents of the present invention in detail with reference to the drawings. FIG. 1 shows a configuration example of a system for implementing the anomaly diagnostic method of the present invention.

The system comprises a sensor signal storage unit 103 for storing a sensor signal 102 that is output from a facility 101, a feature vector extraction unit 104 for extracting feature vector based on the sensor signal 102, a reference vector calculating unit 105 for calculating reference feature vectors at each time based on set of feature vectors of the pre-specified learning period and feature vectors at each time, anomaly measure calculating unit 106 for calculating the anomaly measure based on the difference between the feature vector at each time and the reference feature vector at each time, threshold calculator 107 for calculating a threshold based on the anomaly measure at the pre-specified learning period, the anomaly detector 108 for detecting an anomaly by comparing the anomaly measure with the calculated threshold, distribution density calculation unit 109 for calculating the 2-dimensional distribution density of the sensor signal at the learning period, and an related sensor identification unit 110 for identifying the anomaly-related sensors at the time when anomaly is detected.

In the operation of the system, there are two phases; "learning" creating and storing learning data using the stored data and "anomaly diagnosis" detecting an anomaly based on the input signal and identifying a certain related sensor. Basically former phase is an offline processing, the latter phase is an online processing. However, it is also possible that latter phase be an off-line processing. In the following description, distinguish the two phases using terms of "learning" and "anomaly diagnosis".

Equipment that is a subject of state monitoring 101 is a facilities and plant such as a gas turbine and a steam turbine. Equipment 101 outputs a sensor signal 102 representing the state. Sensor signal 102 is stored in the sensor signal storage unit 103. A list of examples of the sensor signals 102 represented in tabular form is shown in FIG. 4. Sensor signal 102 is a multi-dimensional time-series signal obtained at regular intervals and, the table as a list of sensor signal 102, as shown in FIG. 4, comprises a column 401 of the date and time and a column 402 of data of the plurality of sensor values provided in facility 101. Type of sensors, might also be several such hundreds to thousands, for example, the temperature of a cylinder, oil or cooling water, the pressure of oil or the cooling water, the rotational speed of the shaft, room temperature, operation time and the like. Sensor signal 102 not only represents output and state, in some cases also represents control signals for controlling certain something value.

The process flow of the learning will be described with reference to FIG. 5. When learning, feature vectors are extracted by using the data of the specified period among data stored in the sensor signal storage unit 103. The data extracted here is called learning data. An anomaly measure of the learning data is calculated by cross-validation, threshold of the anomaly determination is calculated based on the anomaly measure of all learning data. Moreover, a 2-dimensional distribution density of the feature value is calculated in the distribution density calculating unit 109.

First, the flow of processing in the feature vector extraction unit 104, in the reference vector calculating unit 105, in the anomaly measure calculating unit 106 and in the threshold value calculation unit 107 will be described with reference to FIG. 5. First, in the feature vector extraction unit 104, the sensor signal 102 on specified time period as a learning period by the sensor signal storage unit 103 is input (S501), each sensor signal are canonicalized (S502), feature vectors are extracted (S503). Then, in the reference vector calculating unit 105, group numbers for the cross-validation are imparted on the extracted feature vectors (S504). Group numbers, such as the extracted feature vectors of one day are imparted on one group, are determined by specifying a period or determined by dividing equally into the previously specified number of groups.

Among the extracted feature vectors, the first feature vector is paid attention to (S505), among feature vectors of different groups from target vectors, pre-specified number of feature vectors are selected in order of proximity to the target vector (S506), reference vectors are created using the selected feature vector (S507). In anomaly measure calculating unit 106, an anomaly measure is calculated based on the distance to the reference vectors of the targeted feature vectors (S508). If anomaly measure calculation of all the vector is completed (S509), in the threshold value calculation unit 107, threshold value is set based on the anomaly measure of all the vectors (S511). If calculation of all the anomaly measure is not completed in step S509, the next feature vector is targeted (S510), the processes from step S506 to step S509 are repeated.

Then, each step will be described in detail. In step S502, each sensor signal is canonicalized. For example, using the mean and the standard deviation of the specified period, each sensor signal is converted as the mean becomes 0 and the standard deviation becomes 1. To enable the same conversion in an anomaly diagnosis, the mean and the standard deviation for each sensor signal are stored. Alternatively, using maximum value and minimum value of each sensor signal on the specified time period, each sensor signal is converted as maximum value becomes 1 and the minimum value becomes 0. Alternatively, it may be possible to use upper limit value and lower limit value set in advance instead of the maximum value and the minimum value. So that the same conversion can be performed in an anomaly diagnosis, the maximum value and the minimum value or the upper limit value and the lower limit value of each sensor signal are stored. The canonicalization of sensor signals is provided to handle sensor signals different in the unit and the scale simultaneously.

In step S503, feature vectors are extracted for each time. Although it is conceivable to arrange the sensor signals canonicalized as it is, by providing the window of ±1, ±2, . . . with respect to each time and using feature vectors as [window width (3, 5, . . . )×number of sensors], it is possible to extract features representing the time variation of the data. Moreover, it is possible to decompose into the frequency components by performing the discrete wavelet transform (DWT). Further, in step S503, feature selection is performed. As a minimum treatment, it is necessary to exclude sensor signals having very small variance and monotonically increasing sensor signals.

In addition, it is conceivable to delete the invalid signals by the correlation analysis. It is a method to remove the overlapping signals among a plurality of signals and to leave not overlapping signals in case performing correlation analysis on multi-dimensional time-series signals, as a result the similarity of the signals is extremely high, such as the correlation value is close to 1, as these signals are redundant. In addition, the invalid signals may specified be user. It is also conceivable to remove characteristic whose long-term variation is large. It is because to use a characteristic whose long-term variation is large leads to increase the number of states of the normal state, and to cause a shortage of learning data. For example, by calculating the average and the variance of each cycle period, it is possible to estimate the amount of the long-term variation by their variance.

As a method of creating reference vectors, local Subspace Classifier (LSC) and projection distance method (PDM) are considered.

Figure 2:
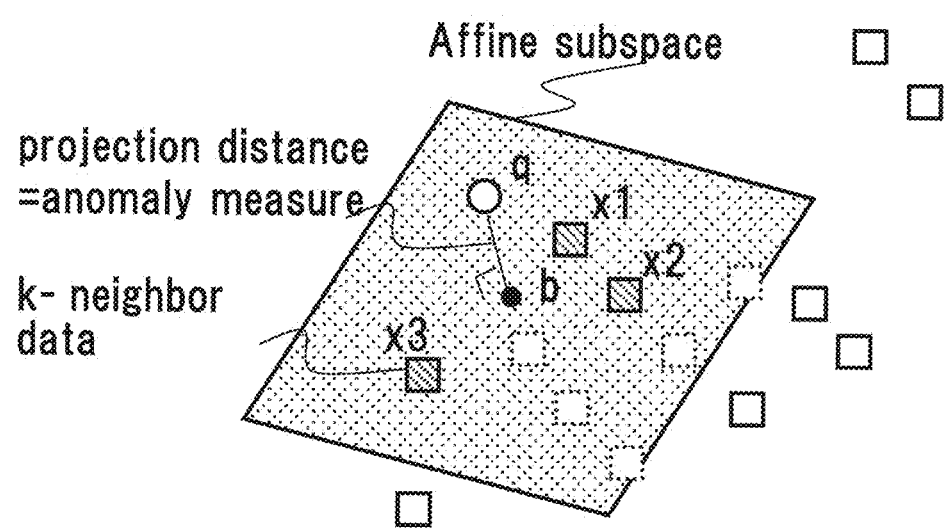
FIG. 2 is a diagram for explaining a Local Subspace Classifier.

Local Subspace Classifier is a method of creating an Affine subspace of dimension k−1 by using a k− neighbor vector of the target vector q. An example in the case of k=3 is shown in FIG. 2. k− Neighbor vector is a feature vector selected in step S506. Specifying number is the value of k.

As shown in FIG. 2, because anomaly measure is represented by projection distance shown in the figure, it may be determined the point b on the nearest Affine subspace target vector q. To calculate evaluation data q and its k− neighbor vector xi (i=1, . . . , k), the correlation matrix C is calculated from the matrix Q in which k of q are lined up and the matrix X in which xi are lined up by [Mathematical Formula 1] and b is calculated from [Mathematical Formula 2]

$$C = (Q - X)^T (Q - X) \qquad \text{[Mathematical Formula 1]}$$

$$b = \frac{C^{-1} I_n}{I_n^T C^{-1} I_n} \qquad \text{[Mathematical Formula 2]}$$

Since anomaly measure d is the distance between q and b, anomaly measure d is expressed by the following equation.

$$d = \|b - q\| \qquad \text{[Mathematical Formula 3]}$$

As it is explained in the case of k=3 in FIG. 2, k may be any number as long as k is sufficiently smaller than the dimensionality of the feature vector. In case k=1, it is equivalent process to the nearest neighbor method.

Projection distance method is a method of creating a subspace that is Affine subspace (Space in which the variance is the maximum) with its own starting point to the selected feature vector. Although any number may be specified in step S506, it is desirable to specify several tens to several hundred because specifying too large number takes long time both to select vectors and to calculate subspace.

A method for calculating the Affine subspace will be described. First, calculating the mean of the selected feature vector μ and covariance matrix Σ, then, by solving the eigenvalue problem of Σ, matrix U obtained by arranging the eigenvector corresponding to the pre-specified r eigenvalues from the largest value is regarded as orthonormal basis of the Affine subspace. r is smaller number than the dimension of the feature vector and the number of selected data. Alternatively, r is not a fixed number; r may be a value when the accumulated contribution rate towards the larger eigenvalue exceeds the rate specified in advance. Anomaly measure is the projection distance to the Affine subspace of target vector.

In addition, local average distance method in which the distance from k− neighbor vector of target vector q to average vector is anomaly measure, Gaussian Process and the like may be used.

The method of setting the threshold in step S511 will be described. The anomaly measure of all feature vectors of the learning period are sorted in ascending order, the value to reach a ratio close to 1, which was specified in advance is obtained. Threshold value is calculated by a process such as adding an offset, multiplying a constant or the like to this value as a reference. If the Offset is 0 or magnification is 1, this value is the threshold value. The calculated threshold value, not shown, is recorded in association with the learning data.

As indicated above, by creating a reference vector using the neighbor vectors of target vector, it is possible to calculate anomaly measure by appropriate standards with high accuracy in facilities where the state changes complexly. Because the threshold value is calculate d based on the anomaly measure calculated by cross-validation of the learning data, it is possible to suppress false alarms.

Then, the flow of processing in the distribution density calculation unit 109 will be described with reference to FIG. 6.

First, the feature vector of the learning period is input (S601). The first feature is targeted (S602), and the maximum value (MAX) and minimum value (MIN) of the data in the learning period are obtained (S603). Then, calculating the step size S in case dividing value from minimum value to the maximum value into the specified number of value (S604). The value can be calculated by S=(MAX−MIN)/N. Then, broadening the range outside from the value between the minimum value and the maximum value, the processing range of the distribution density is calculated (S605). The broadened range is set, for example, by changing MIN to MIN−S×M and MAX to MAX+S×M. In these equations, M is a pre-determined integer of 1 or more.

Next, for all the data in the learning period, the bin number (BNO) is calculated from the feature values (F) by the following equation (S606).

$$BNO=INT((F-MIN) \cdot N/(MAX-MIN))$$

In this equation, INT (X) represents an integer part of X.

If there remains features not yet processed (S607), targeting on the following features (S608), processes from step S603 to step S606 are performed. If all features are already processed in step S607, the process is proceeded to step S609.

In step S609, two of the first combination features are targeted. Two features may be the same. Then, securing the 2-dimensional array for the distribution density calculation, all the elements are set to 0 (S610). The size of the array is N+2M. For all data in the learning period, 1 is added to the elements of the array corresponding to the bin number of the two features (S611). In this process, 2-dimensional frequency distribution by two features (histogram) is calculated. The frequency distribution is converted to the image and is saved (S612). Conversion method will be described later. If the process for all combinations of two features are already performed (S613), the process ends (S615), and otherwise, noting the following combinations (S614), the processes from step S610 to S612 are performed. Not shown in Figures, the size of the 2-dimensional array and the minimum value and the maximum value of each feature calculated in step S605 are recorded.

In step S612, an example of an image conversion method will be described. First, the maximum value of the array elements, ie, the maximum frequency is obtained. Image size is same as the array size and, for example, the pixel value of the corresponding coordinates is obtained from the values of each element as [255×element value of array/maximum frequency]. 255 is the maximum value when it represents a pixel value by 8 bits, and if using this value, it can be directly stored in the bitmap format. Alternatively, the pixel values are set as [255×LOG (array element values+1)/LOG (maximum frequency+1)]. In this formula, LOG (X) represents the log of X. By using such a conversion formula, it is possible to correspond to the frequency of non-zero to the pixel value of non-zero even when the maximum frequency is large.

Image obtained by the above process, since the place dense on a 2-dimensional feature space is represented by a high pixel value, which is referred to as a distribution density image. How to make the image is not limited to the above method. For example, rather than a simple frequency distribution, it may be also possible to assign a Gaussian distribution or other weighted filter to one of the data, and to superimpose them. Alternatively, it may be also possible to apply the maximum value filter of a predetermined size, the mean filter or other weighted filter to the image obtained by the above method. The 2-dimensional array does not always have to be stored in the image format; it may also be possible to be stored in text format.

The flow of the processes in the anomaly diagnosis will be described with reference to FIG. 7 to FIG. 9. In the anomaly diagnosis, anomaly measure the data for the specified time period or newly observed data among the data stored in the sensor signal storage unit 103 is calculated, a determination is made whether the data is normal or abnormal and, the related sensors is identified at the time when certain data is determined as abnormal.

Figure 7:
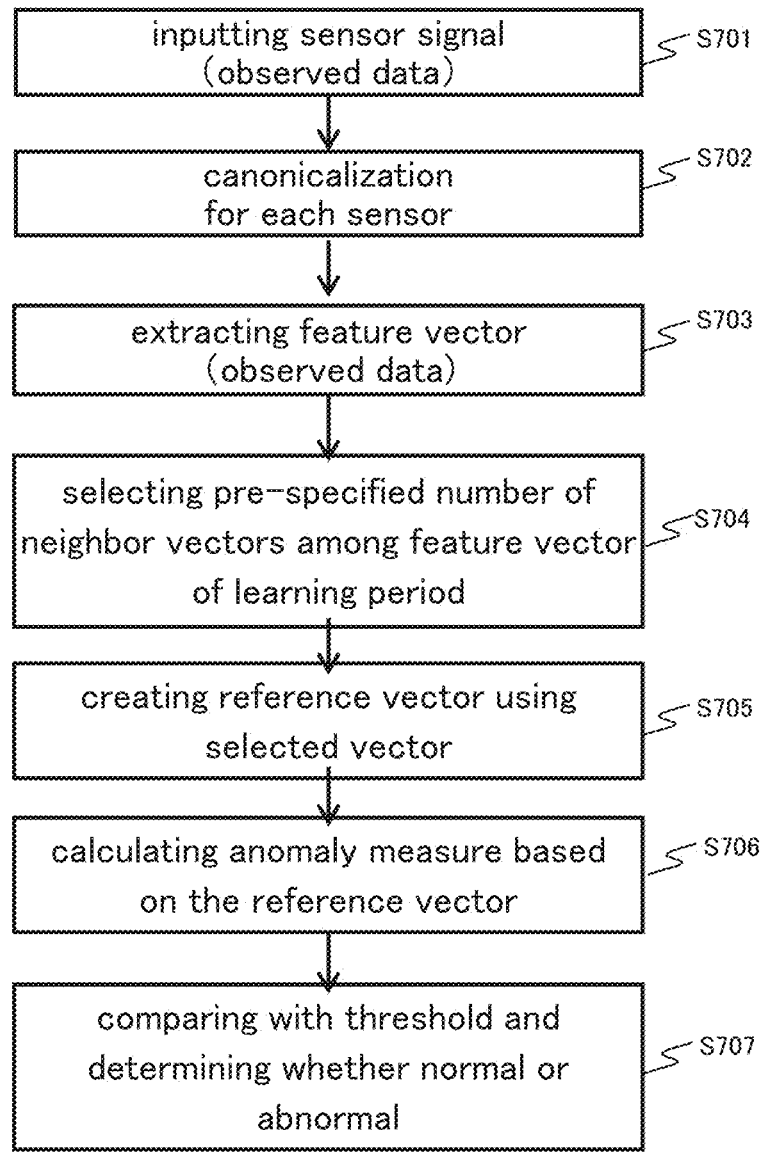
FIG. 7 is a flowchart showing a flow of processes from the sensor signal input to the anomaly determination.

FIG. 7 is a view for explaining the flow of processing in the feature vector extraction unit 104, the reference vector calculating unit 105, the anomaly measure calculating unit 106, and the anomaly detection section 108 at the time of anomaly diagnosis. First, in the feature vector extraction unit 104, sensor signals are input from the sensor signal storage unit 103 or equipment 101 (S701), after canonicalization is performed each sensor signal (S702), and feature vectors are extracted (S703). The canonicalization of the sensor signals is performed, in the process shown in step S502 in FIG. 5, using the same parameters as those used for the canonicalization of learning data. Feature vectors are extracted in the same way as the process of step S503. Therefore, the same features are selected if features are selected in step S503. The feature vectors extracted here, it is referred to as the observation vector to distinguish them from the learning data.

Then, in the reference vector creating unit 105, from among the feature vectors of the learning data, a pre-specified number of feature vectors in order of proximity to the observation vector are selected (S704), the reference vector is created using their feature vectors (S705). In the anomaly measure calculating unit 106, the anomaly measure is calculated based on the distance to the reference vector from the observation vector (3706). In the anomaly detecting unit 108, by comparing the threshold and the anomaly measure calculated at the time of learning, if the anomaly measure is larger than the threshold, it is determined as anomaly and if not, it is determined as normal (S707).

Figure 8:
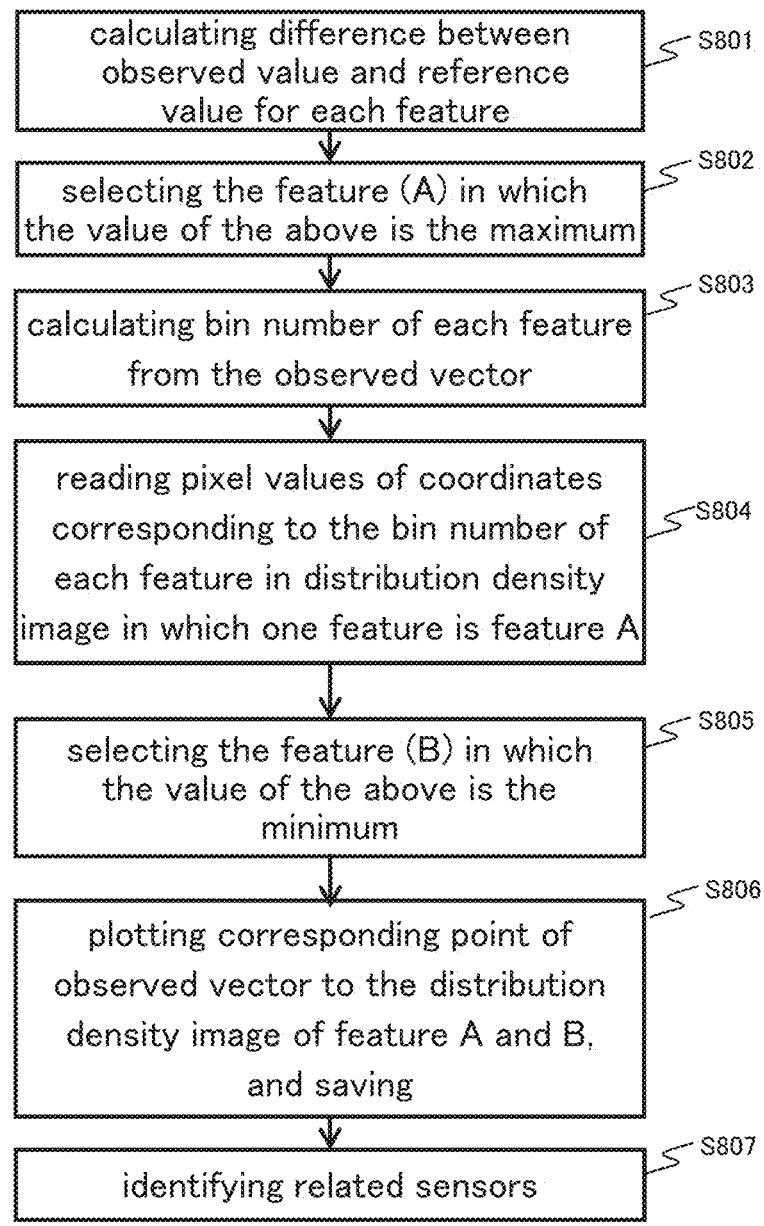
FIG. 8 is an example of a flowchart showing a flow of processes of identifying anomaly-related sensors.

FIG. 8 is a drawing for explaining an embodiment of a process flow in the related sensor identification unit 110. This process is performed for the data determined as abnormal in step S707. First, from the observation vector and the reference vector, difference between the observed value of each feature and the reference value is calculated (S801), the feature in which the difference is maximum is searched (S802). This feature is characterized as A. Then from the observation vector, using the size of the 2-dimensional array used in the distribution density calculation process shown in FIG. 6 and the minimum value and the maximum value of each feature calculated in step 3605, the bin number of each feature (S803) is calculated. The distribution density image, in which one feature is a feature A, is read, and pixel values of coordinates corresponding to the bin number of each feature and the feature A is read (S804), to the feature in which the pixel value is minimum is searched (S805). This feature is characterized as B, and the corresponding points of the observation vector are plotted to the distribution density image of the feature A and the feature B (S806). For example, converting the color image, colors not used in the corresponding coordinates to the bin number of the feature A and the feature B are added. If the pixel value at S804 is 0 or is smaller than a predetermined value, the feature A and the feature B is identified as the related sensors (S807).

Figure 9:
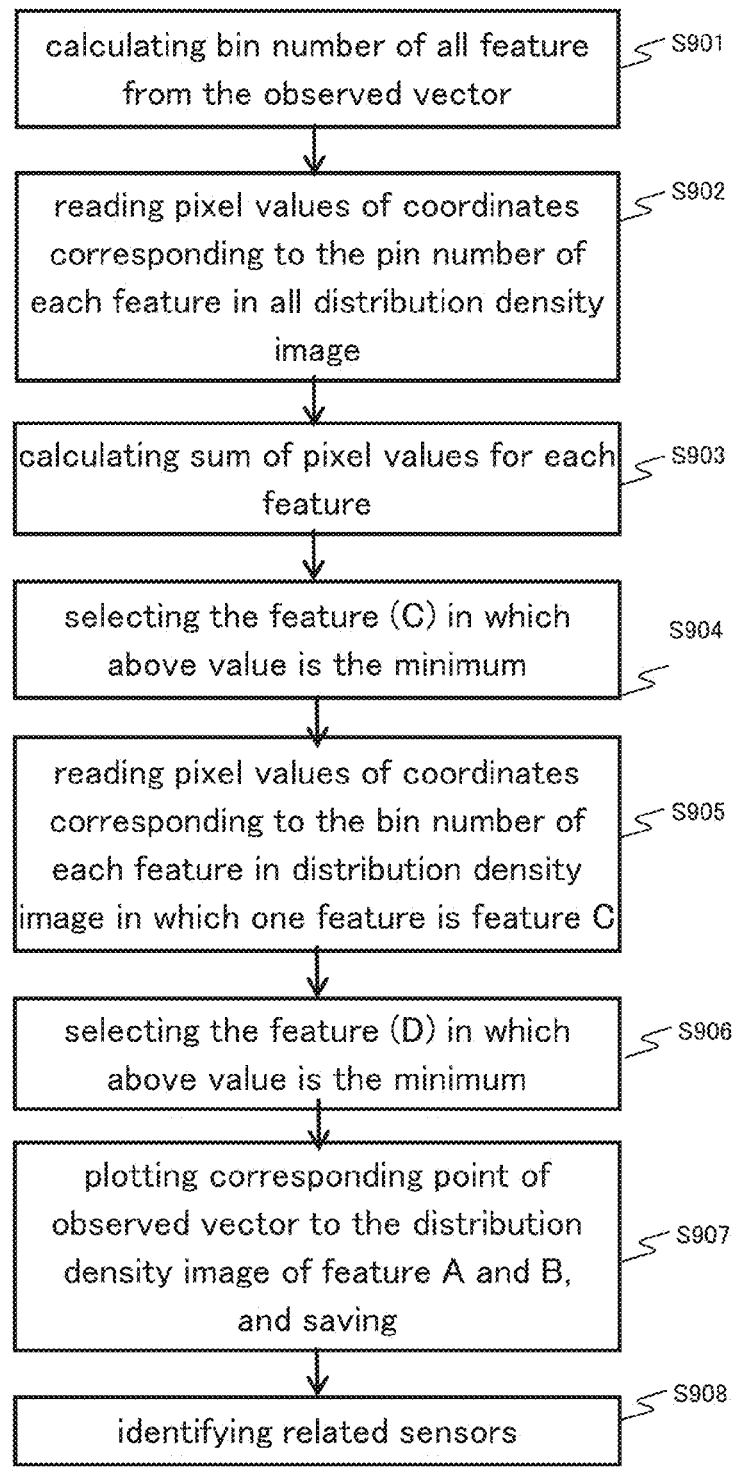
FIG. 9 is another example of a flowchart showing a flow of processes of identifying anomaly-related sensors.

FIG. 9 is a drawing for explaining another embodiment of a process flow in the related sensor identification unit 110. Like the processes of FIG. 8, in step S707, processes are performed for the data determined as abnormal. First, from the observation vector, using size of the 2-dimensional array that was used in the distribution density calculation process shown in FIG. 6 and the minimum value and maximum value of each feature calculated in step S605, the bin number of each feature is calculated (S901).

Then, reading all the distribution density images, pixel values of coordinates corresponding to the two bin number in each of the distribution density image are read (S902), the sum of the value $s_i$ for each feature is calculated (S903). In other words, If values read in the distribution density image of the feature i and the feature j are I (i, j), $s_I$ is calculated by the following equation.

$$s_i = \sum_j I(i, j)$$ [Mathematical Formula 4]

Looking for the feature in which this $s_I$ is minimum (S904), this feature is characterized as C. Next, in the distribution density image in which one feature is feature C, the pixel values of coordinates corresponding to the bin number of each feature and feature C are read (S905), the feature in which the pixel value is minimum is looked for (S906). This feature is characterized as D, and the corresponding points of the observation vector are plotted to the distribution density image of the feature C and the feature D in the same manner as in step S806 (S907). If the pixel value at S905 is 0 or is smaller than a predetermined value, the feature C and the feature D is identified as the related sensors (S908).

In another embodiment, calculating a bin number for each feature in step S901, after reading the pixel value of the coordinates corresponding to the observation vector for all of the distribution density image at step S902, looking for the combination of features in which the pixel value is the minimum, and these features are characterized as feature E and feature F. The corresponding points of the observation vector is plotted to the distribution density image of the feature E and the feature F in the same manner as in Step S806, if the pixel value read from the distribution density image of the feature E and the feature F is 0, 0 or is smaller than a predetermined value, the feature E and the feature F is identified as the related sensors.

Above, among described methods of identifying related sensor, it may be possible to carry out one of them, it may be possible to carry out them sequentially until the related sensor can be identified, and it may be possible to carry out all of them, displaying the distribution density image obtained by plotting the observation vector, and then it may be possible to let the user decide.

Furthermore, a method of analyzing in detail in case related sensor cannot be identified by the above method will be described with reference to FIG. 10. First, the feature vectors of the learning period are input (S1001). Next, for all data in the learning period, using the size of the 2-dimensional array used in the distribution density calculation process shown in FIG. 6 and the minimum value and the maximum value of each feature calculated in step S605, the bin number of each feature is calculated (S1002). Similarly, the bin number of each feature of the observation vector is calculated (S1003).

Then, only the bin number in which the feature A described above is the same data as the observation vector is extracted from the feature vectors of the learning period (S1004), in accordance with from step S610 to step S612 using these data, and partial distribution density image of combination except for features A is created (S1005). The pixel values of the coordinates corresponding to the two bin number for all partial distribution density image are read (S1006), the sum of the values for each feature is calculated (S1007). Looking for a feature in which the sum is the minimum (S1008), this feature is characterized as feature G.

In partial distribution density image in which one of the features is characteristic G, reading the pixel value of the coordinates corresponding to the bin number of each feature and feature G (S1009), looking for feature in which the value is the minimum and this feature is characterized as feature H (S1010). The corresponding points of the observation vector are plotted to the partial distribution density image of feature G and feature H (S1011). If the pixel value at S1009 is 0 or is smaller than a predetermined value, the feature A, the feature G and the feature H are identified as the related sensors (S1012). In these processes above said feature C can be used instead of the feature A.

The above method is a method of identifying the relevant sensors for each time when anomaly is detected; if the method is applied when anomaly is detected continuously processes become redundant. Therefore, it is conceivable that while the anomaly is detected continuously, accumulating information in a buffer, processes are performed collectively. In this case, the target to specify the sensors may narrow down based on duration of anomaly or cumulative anomaly measure of anomaly.

The method of identifying the related sensors for a series of abnormal sections consecutively detected will be described with reference to FIG. 10. First, based on the result of anomaly determination has been performed in step S707 in the anomaly detecting unit 108, and the section in which the anomaly was detected continuously is specified (S1101). Meanwhile, the observation vector and the reference vector are stored in the buffer. In addition, "Continuous" is not necessarily in a strict sense and it may include interruption of a predetermined length. Then, for all observation vectors included in the section, calculating the sum of the absolute value of the difference between the observed value and the reference value for each feature (S1102), the features in which the sum is the maximum is searched (S1103). This feature is characterized as feature A.

Figure 6:
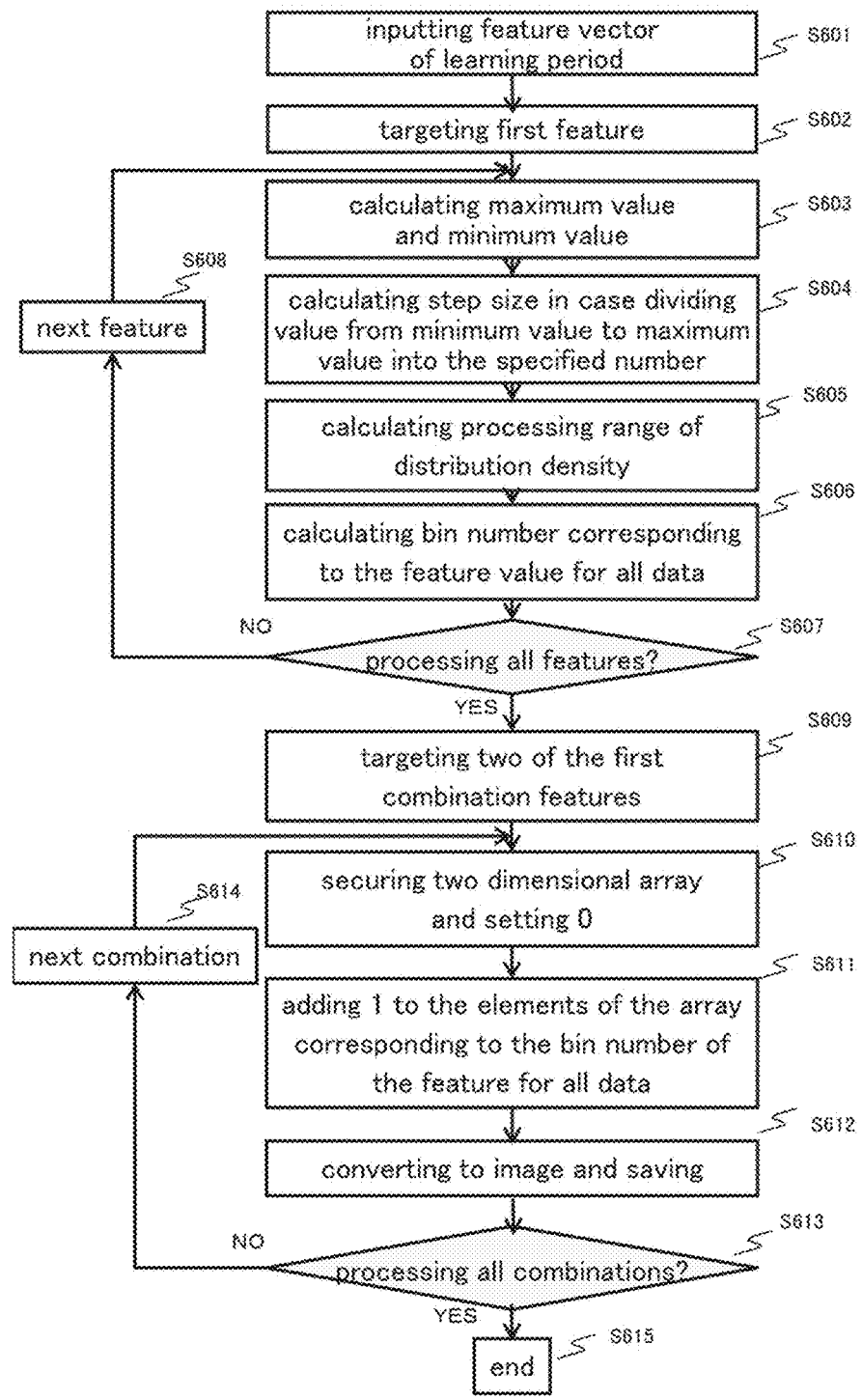
FIG. 6 is a flowchart showing a flow of processes for calculating the 2-dimensional distribution density of the features.

Then, for all observation vectors included in the section, using the size of the 2-dimensional array used in the distribution density calculation process shown in FIG. 6 and the minimum value and the maximum value of each feature calculated in step S605, the bin number of features is calculated (S1104). Reading the distribution density images in which one feature is feature A, for all observation vectors included in the section, the pixel values of coordinates corresponding to the bin number of each feature and the feature A are read (S1105). Pixels of the non-zero for each feature for all observation vectors included in the section are counted (S1106). The counted value for feature i is the cnt (i). Moreover, the sum of the pixel values for each feature for all observation vectors included in the section is calculated (S1107). The value calculated for the feature i is sum (i). Features in which cnt (i) is minimum is searched, features which sum (i) is minimized if there are a plurality of features in which cnt (i) is minimum, feature in which sum (i) is minimum among them is searched (S1108). This feature is characterized as B, and the points corresponding to the observation vectors in the abnormal section are plotted in the distribution density image of the feature A and the feature B (S1109). If the number of pixels of non-zero in S1106 is smaller than the number of the observation vectors included in the section, in other words, if the number of pixels of 0 is one or more, the feature A and the feature B are identified as the related sensor (S1110).

Alternatively, if there are a plurality of features in which cnt (i) is minimum; it may be possible to a feature characterized as B, looking for features highly correlated to the learning data. The height of the correlation is determined based on, for example, the correlation value of the feature A and another feature. Alternatively, what the number of non-zero pixels of the distribution density image is small is considered to have a high correlation.

Figure 10:
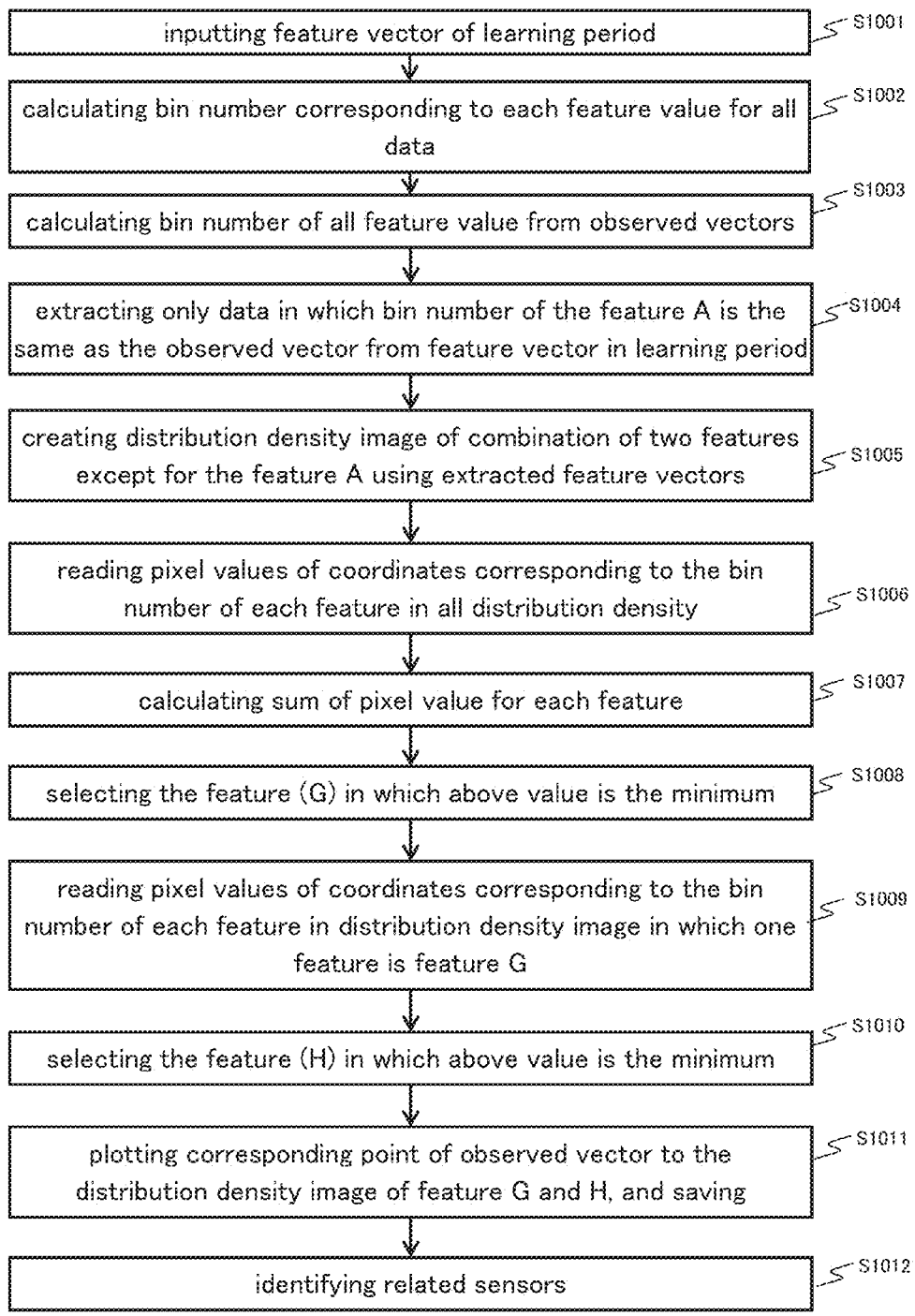
FIG. 10 is a flow chart showing the flow of processes of identifying the three anomaly-related sensors.
Figure 11:
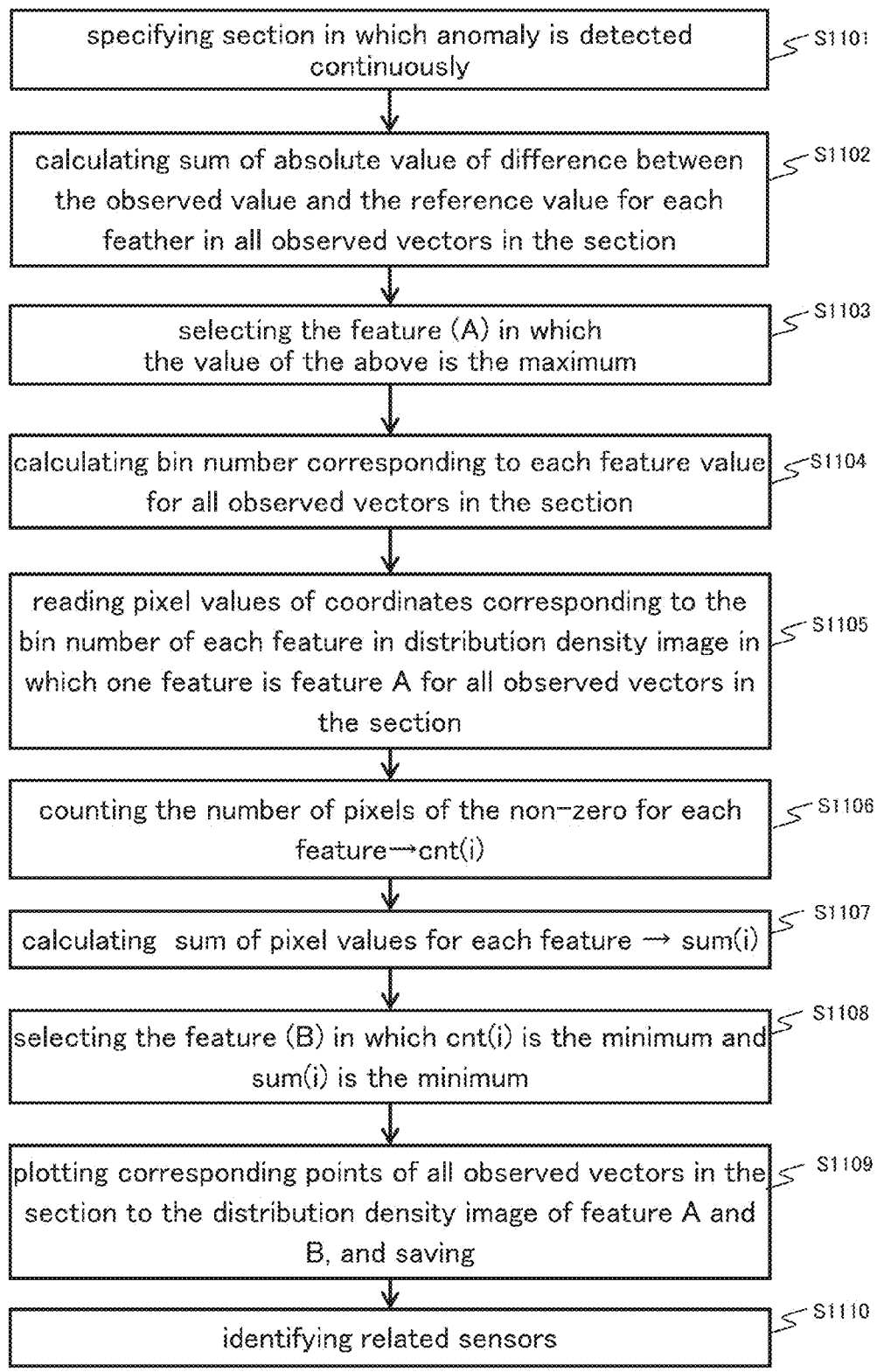
FIG. 11 is a flow diagram showing the flow of processes for identifying the related sensor for each section including continuous anomaly.

The processing flow of FIG. 11 described above are the processes shown in FIG. 8 using the plurality of observation vectors, the processes shown in FIG. 9 or FIG. 10 using the plurality of observation vectors may be used or may be used in combination thereof.

Figure 12A:
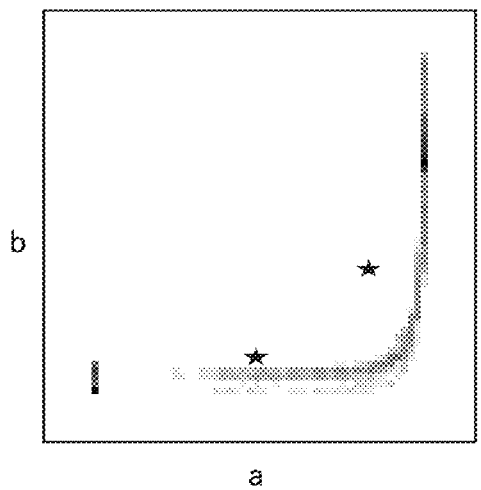
FIG. 12A is a diagram showing an example of plotting the corresponding points of the abnormal section in the distribution density image.
Figure 12B:
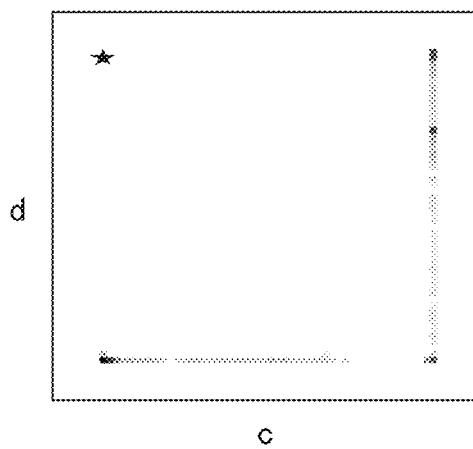
FIG. 12B is a diagram showing an example of plotting the corresponding points of the abnormal section in the distribution density image.
Figure 12C:
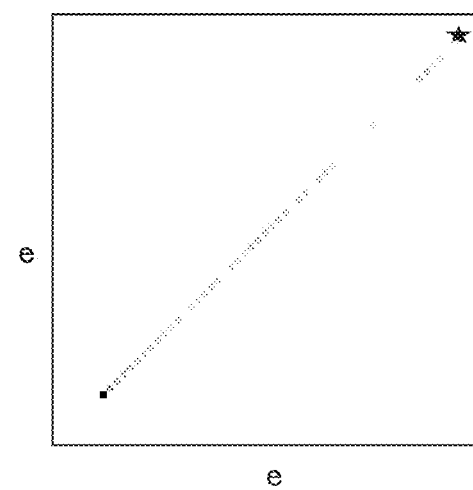
FIG. 12C is a diagram showing an example of plotting the corresponding points of the abnormal section in the distribution density image.

An example of distribution density image created at step S1109 is shown in FIGS. 12A-12C. The horizontal axis and the vertical axis represent the relative values of each feature, the dark part of the color represents a high density portion of the learning data. Asterisks represent the observed data in the abnormal section. In fact, it may be displayed with the color.

FIG. 12A represents the distribution density of feature a and feature b. From the distribution of the learning data, there are a steady state wherein both feature a and feature b are the low state and a steady state wherein both feature a and feature b are high state, and it is seen that feature b rises late with respect to the timing of rising of feature a at the state transition. Relationship between the time shifts is stable. It is detected as an anomaly when feature b rises early with respect to the timing of rising of feature a. Alternatively, the shift of the timing of falling may be detected, whether rising or falling can be identified from the time series graph of the sensor signal.

FIG. 12B represents the distribution density of feature c and feature d. There are states that the both feature c and feature d are low state, feature c is high state and feature d is low state, both feature c and feature d are high state, and both feature c and feature d are intermediate state, but there is no state that feature c is low state and feature d is high state. Such state detected as an anomaly.

FIG. 12C represents the value of the feature e in the horizontal axis and the vertical axis also. In actual, it is not a 2-dimensional, but by representing an image of the same format, it is possible to ease of displaying and processes of specifying sensors. Learning data is distributed on a straight line. Value of the feature e is detected as an anomaly since the value is higher than any value of the learning data.

Figure 3A:
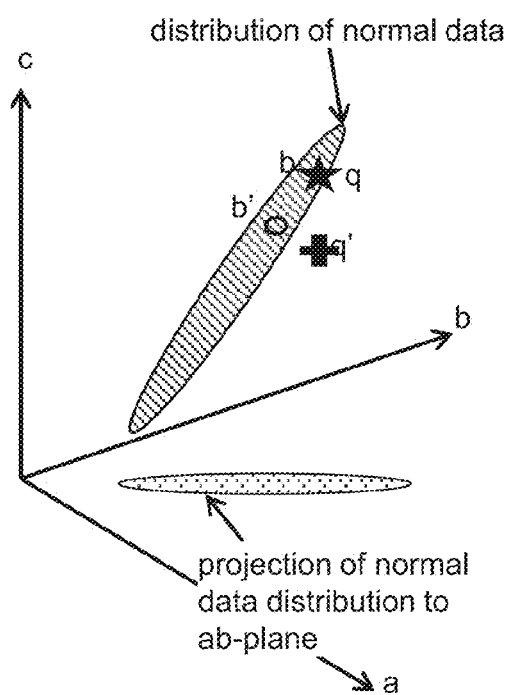
FIG. 3A is a 3-dimensional graph for explaining an example of the error in identifying the sensor signals based on the contribution amount and showing the distribution of normal data.
Figure 3B:
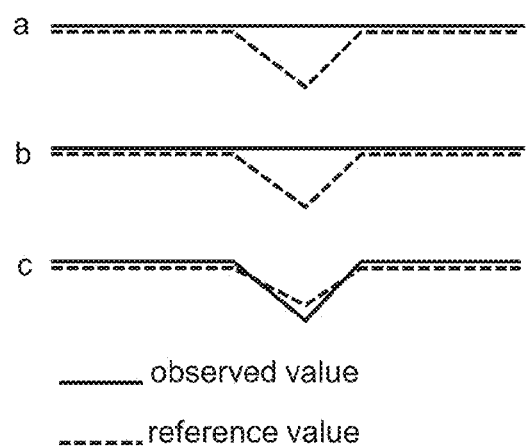
FIG. 3B is a graph for explaining an example of the error in identifying the sensor signals based on the contribution amount and, a graph of the sensor signal indicating the change in the observed values to the reference values of the three sensor signals.
Figure 12D:
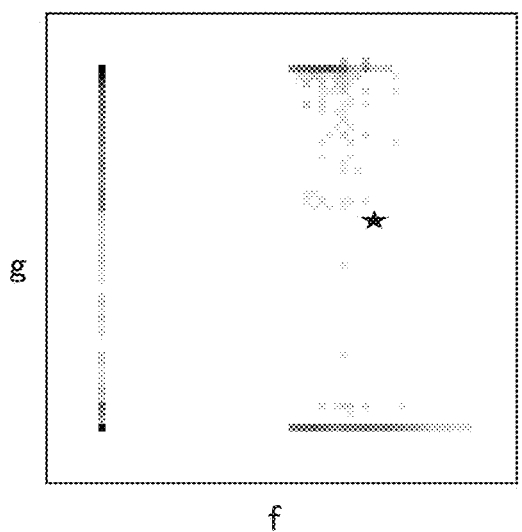
FIG. 12D is a diagram showing an example of plotting the corresponding points of the abnormal section in the distribution density image.

As described above, because a 2-dimensional feature distribution density of all combinations using the learning data are calculated in advance and the anomaly-related sensors are identified based on the distribution density of the corresponding point of the observation vectors when an anomaly is detected, it is possible to identify the correct sensor even when it is a situation as shown in FIG. 3A and FIG. 3B. Also, by representing a 2-dimensional feature distribution density in the image to the user, it can be easily understood that the sensors are related with anomaly. Also, it is possible to know the tendency of the distribution of the learning data. For example, as shown in FIG. 12D, when the lower portion of the density of the learning data is present in a wide range, it is necessary to doubt whether it is really abnormal as anomaly indicated by an asterisk 1201 is detected. In that case, it may be better to increase the density by increasing the learning period, or not to process together in this combination, specifically, to remove the feature g from the process.

The embodiment of a GUI of a system implementing the above method will be described.

Figure 13:
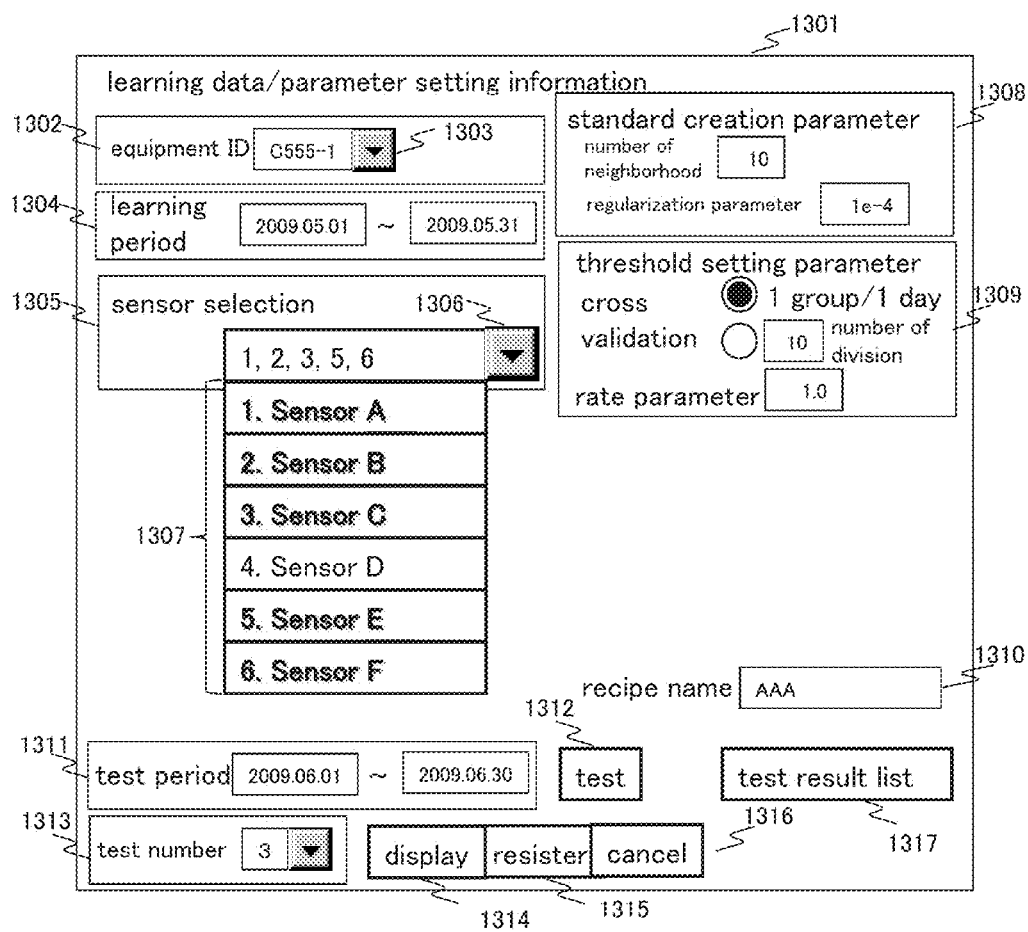
FIG. 13 is a front view of a display screen showing an example of a GUI for recipe setting.

An example of the GUI for setting the learning period and processing parameters is shown in FIG. 13. In the following description, this setting will be referred to simply as recipe setting. Also, the past sensor signal 102 is assumed to be stored in association with the equipment ID and time to the database. In recipe setting screen 1301, a target device, learning period, sensors to be used, standard calculation parameters, threshold setting parameters are input. The ID of the target equipment is input into an equipment ID input window 1302 is input. By pressing the equipment list display button 1303, the list of the device ID of the data stored in the database is displayed, it is not shown in Figures, the device ID is selected from the list and input.

The start and end dates of the period for which users want to extract the learning data are input into a learning period input window 1304. Using sensors are input into the sensor selection window 1305. The sensor list 1307 is displayed and by clicking the list display button 1306, a sensor is selected and input from the list. It is also possible to select more than one from the list. A parameter specifying in the regular modeling is input into the standard calculated parameter input window 1308. Figure is an example of the case of adopting the local subspace as a regular model, and the number of the neighbor vector and normalization parameters to be used for modeling is input. Normalization parameter, to prevent the inverse matrix of the correlation matrix C from not being determined in Mathematical Formula 2, is a small number to be added to the diagonal elements.

Figure 5:
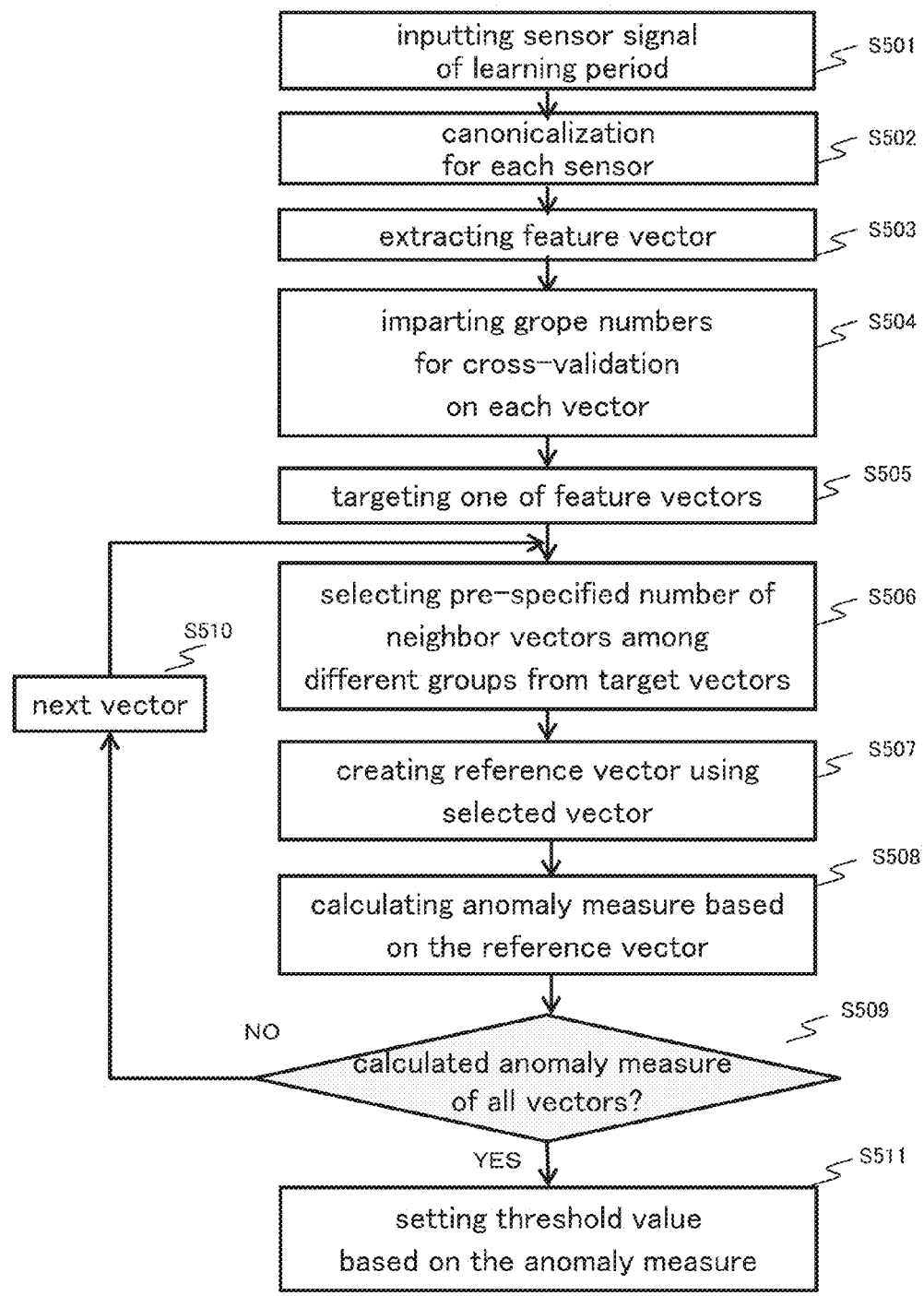
FIG. 5 is a flowchart showing the flow of processes from the sensor signal input to the threshold setting.

In threshold setting parameter input window 1309, how to determine the group of cross-validation in the process shown in FIG. 5 is selected by pressing a radio button. Selecting whether to impart one day on one group or divide into the specified number of groups. In the latter case, the number of groups is input. Also, the ratio to be applied to the cumulative histogram is input in the threshold setting process of step S511. A unique name to be related with the input information is input into the recipe name input window 1310. When all of the information have been input, the test period is input into to test period input window 1311 and a test of recipes are performed by pressing the test button 1312.

By this operation, the serial number of the tests that were run on the same recipe name is numbered. Then, in the feature vector extraction unit 104, the feature vector is extracted from the sensor signal 102 of the specified learning period. In the canonicalization of step S502 which has been described with reference to FIG. 5, the average and the standard deviation is obtained using all the data of the specified learning period. The value of the average and standard deviation are saved for each sensor in association with the recipe name and test number.

In response to the step S507 as described in FIG. 5, reference vectors of each time are created in the reference vector calculating unit 105 by the cross-validation and in response to the step S508, the anomaly measure is calculated in the anomaly measure calculating unit 106. Furthermore, in response to step S511, the anomaly judging threshold value is calculated at the threshold value calculation unit 107, and it is saved in association with the recipe name and test number. In the distribution density calculation unit 109, a distribution density image of 2-dimensional feature is created and saved by the processes shown in FIG. 6. In addition, features in all processing range calculated in step S605 are saved. Other, device ID information, using sensor information, learning period, parameters used in the feature vector extraction, and the reference creating parameter are saved in association with the recipe name and the test number.

Then, using the sensor signals 102 of the specified test period as input, anomaly detection shown in FIG. 7 is processed. To the detected anomaly, processes of related sensor specifying are performed by the procedure shown in FIGS. 8 to 11. Serial numbers are added to detected anomaly for each section. For each section, the serial number, the interval start time, end time interval, a plurality of the relevant sensor names and name of distribution density image in which corresponding points of the observation vector are plotted are recorded.

Figure 14A:
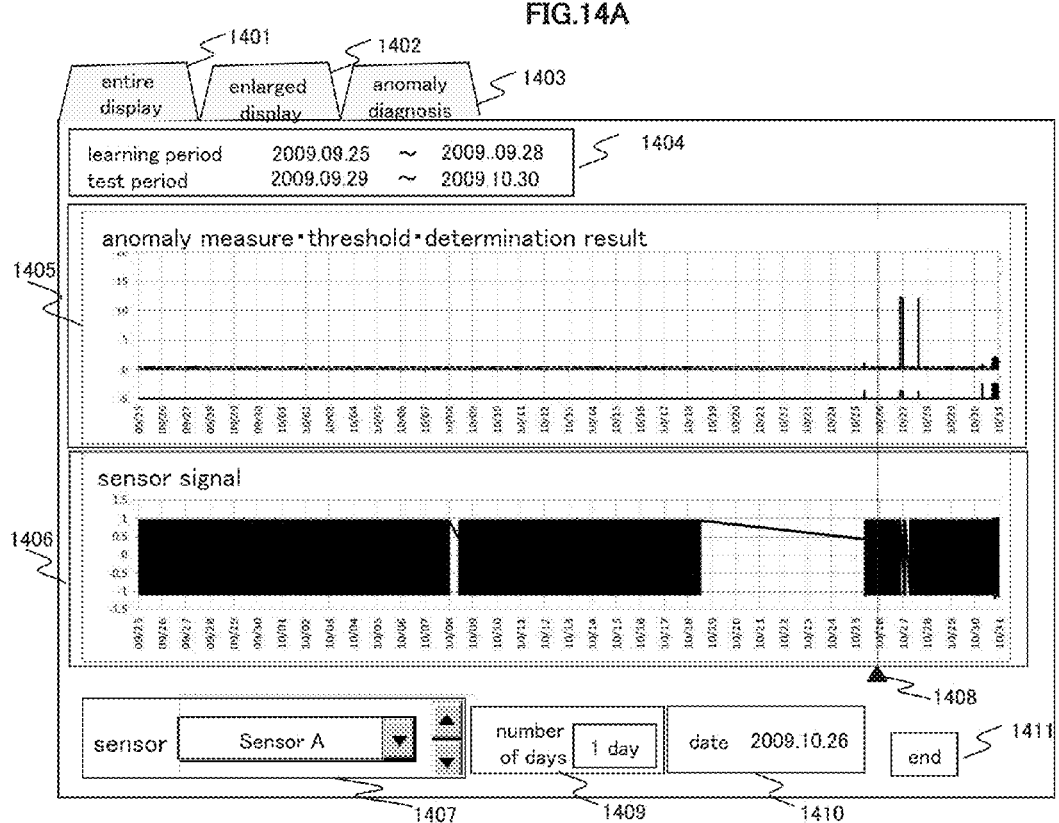
FIG. 14A is an example of the result display screen and a front view of a screen displaying a plurality of time-series data.
Figure 14B:
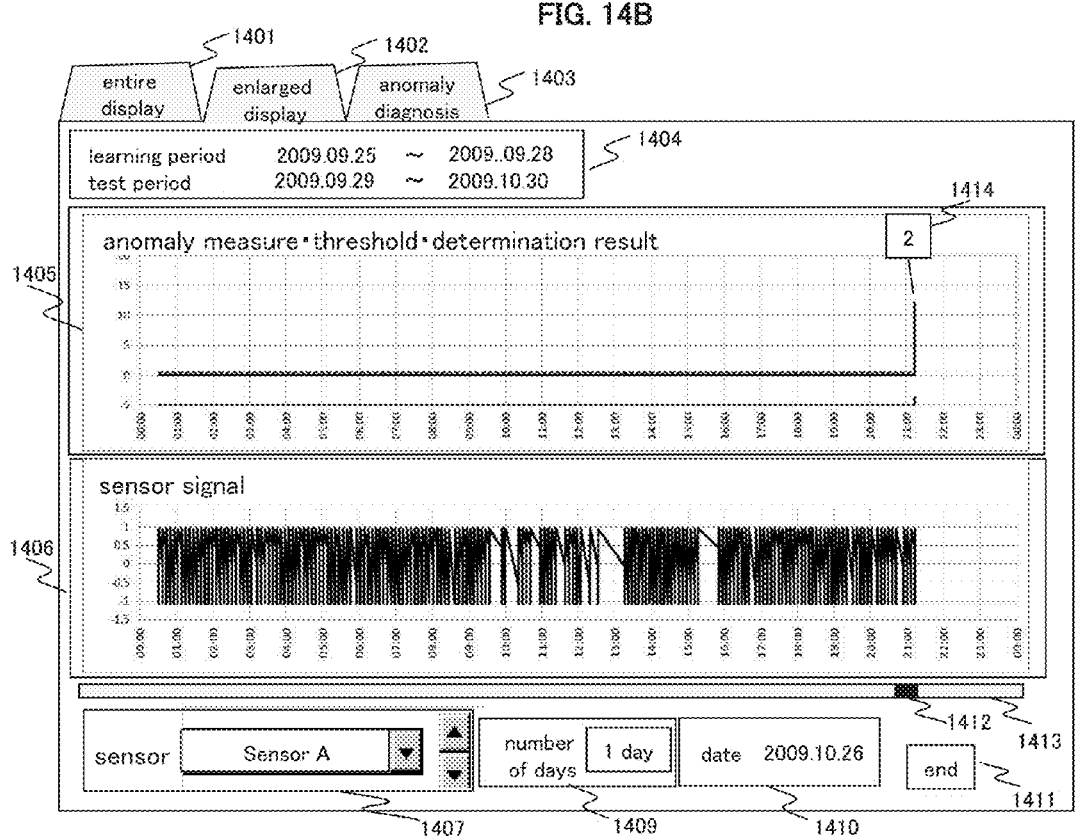
FIG. 14B is an example of the result display screen and a front view of a screen displaying an enlarged view of the plurality of time-series data.
Figure 14C:
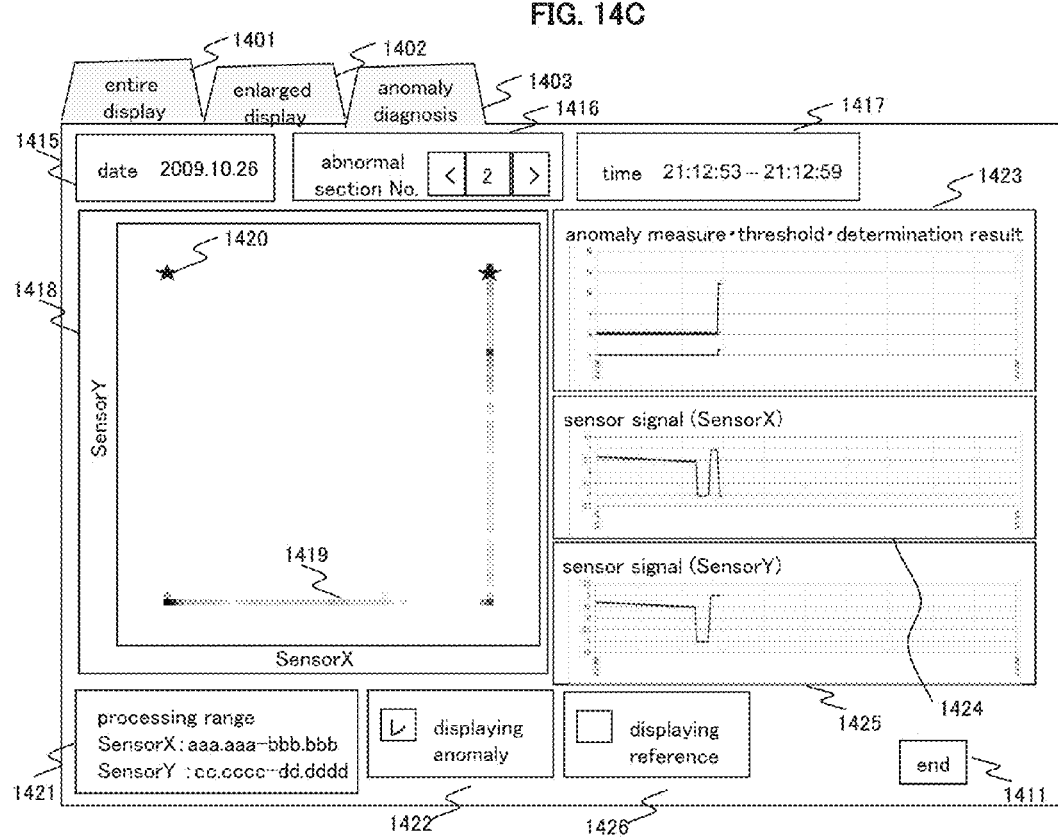
FIG. 14C is an example of the result display screen and a front view of a screen displaying the distribution density of the anomaly-related sensor and the plurality of time-series data.

An example of a GUI to show the results of the test to the user is shown in FIG. 14A, FIG. 14B and FIG. 14C. By selecting a tab displayed at the top of each screen, it is possible to switch an entire result display screen 1401, an enlarged result display screen 1402 and an anomaly diagnosis result display screen 1403.

In FIG. 14A, the entire result display screen 1401 is shown. In the entire result display screen 1401, anomaly measure of the specified entire period, the threshold, the determination result and the time-series graph of the sensor signal are displayed. In the time display window 1404, the specified learning period and the test period are displayed. In the anomaly measure display window 1405, the anomaly measure, the thresholds and the determination result in the specified learning period and the test period are displayed. In the sensor signal display window 1406, the output value for specified sensors for a specified period is displayed. Specification of the sensor is performed by an input to the sensor name selection window 1407. However, before the user specifies, the head of the sensor is selected. Cursor 1408, representing the starting point of time of the enlarged display, can be moved by mouse operation.

In display number of days specifying window 1409, in the result enlarged display screen 1402, the number of days from the starting point to the end point of the enlarged display is displayed, although it is not used in this screen. It is also possible to enter on this screen. In the date display window 1410, date of the cursor position is displayed. By entering an end button 1411, the entire result display screen 1401, the result enlarged display screen 1402 and the anomaly diagnosis result display screen 1403 are all cleared to the end.

In FIG. 14B, the enlarged result display screen 1402 is shown. In the enlarged result display screen 1402, as the date indicated by the cursor 1408 in the entire result display screen 1401 is a starting point, the anomaly measure of a specified number of days, the threshold, the determination result and the time-series graph of the sensor signals are displayed. In the time period display window 1404, the same information as the entire result display screen 1401 is displayed. In the anomaly measure display window 1405 and the sensor signal display window 1406, the same information as the entire result display screen 1401, is enlarged and displayed. In display number of days specifying window 1409, the number of days from the starting point to the end point of the enlarged display is specified.

In the date display window 1410, the starting date of the enlarged display is displayed. It is also possible to change the starting point of the display in the scroll bar 1412, this change is reflected in the position of cursor 1408 and the display of the date display window 1410. Total length of the scroll bar display area 1413 corresponds to the entire period displayed in the entire result display screen 1401. The length of the scroll bar 1412 corresponds to the number of days specified in the display number of days specifying window 1409, the left end of the scroll bar 1412 corresponds to the starting point of the larger display. The time when the anomaly is detected, the abnormal section number 1414 is displayed with balloon at the corresponding position in the anomaly measure graph. By pressing the end button 1411, the enlarged result display screen 1402 finishes.

In FIG. 14C, an example of the anomaly diagnosis result display screen 1403 is displayed. A 2-dimensional feature distribution density and a time-series graph of anomaly-related sensors are displayed together. When it is switched to the display screen 1403, the anomaly of youngest number is the object of displaying among anomalies displayed in the result enlarged display screen 1402. The date display window 1415, the date of the display object anomaly is displayed. Abnormal section number display window 1416, section number of the display object anomaly is displayed.

In abnormal section number display window 1416, by inputting value, it is possible to specify the abnormal section number. In the time display window 1417, section start time and section end time of the display object anomaly are displayed.

In the distribution density display window 1418, the image stored in step S1109 in FIG. 11 is displayed, for example. This image represents 2-dimensional frequency distribution of two sensors identified at step S1110, the horizontal axis represents normalized value of "Sensor X", the vertical axis represents normalized value of "Sensor Y". 1419 represents the distribution of the learning period, meaning that the darker it is displayed, the more it is frequent. 1420 is a data corresponding to the observation vector of the abnormal section of the display object. In an abnormal display instruction window 1422, by unchecking the check box, it is also possible to choose not to display; it is possible to confirm the distribution density of the data of the learning period of the feature values. In the process range display window 1421, the processing range calculated in step S605 of the two sensors is displayed. These values are the value of "Sensor X" corresponding to the left end, the value of "Sensor X" corresponding to the right end, the value of "Sensor Y" corresponding to the lower end and the value of "Sensor Y" corresponding to the upper end of the distribution density image.

In the anomaly measure display window 1423, the anomaly measure, the threshold value and the determination result in the period including the abnormal section of the display object are displayed. The sufficiently enlarged length as display period is determined in advance so that the change of the signal is observable. In the first related sensor signal display window 1424, the output value of one of the two sensors identified at step S1110 in the same period as the anomaly measure display window 1423 is graphically displayed. In the second related sensor signal display window 1425, the other sensor signal output values are graphically displayed. By checking the check boxes of the reference display instruction window 1426, it is not shown in Figures; it is possible to display reference values superimposed with different colors in the first related sensor signal display window 1424 and a second related sensor signal display window 1425.

Button 1427 and button 1428 are buttons for switching the anomaly diagnosis results to display and, by clicking the button 1427 "Next", the next smallest number of the anomaly data in the anomaly diagnosis result display screen 1403 to the anomaly data currently displayed is displayed. Also, by clicking the button 1428 "before", the next smaller number of the anomaly data in the anomaly diagnosis result display screen 1403 data of the currently displayed abnormal diagnostic result than the anomaly data currently displayed is displayed.

Also, although it is not shown in Figures, in the distribution density display window 1418, it may be possible to display images of number of tables stored in step S1109 side by side.

In the Figures, the time series graphs of the two sensors are separately displayed; it may be possible to display them superimposed in different colors in a single window. By pressing the end button 1411, the window finishes.

In any of the screens shown in FIGS. 14A-14C, after confirmation of anomaly detection result and diagnostic result is finished by pressing the end button 1411, the process returns to the display of the recipe setting screen 1301 shown in FIG. 13. In the test number display window 1313, the test numbers numbered by the test are displayed.

If there is a problem in the confirmed content, changing the learning period, the selected sensor, change the parameters, etc., the test is performed again by pressing the test button 1312. Alternatively, it is possible to confirm the results of the test performed once again. Selecting and inputting the test number from the test numbers display window 1313, the display button 1314 is pressed. By this operation, the information stored in association with the recipe name and test number is loaded and displayed in the results entire display screen 1401. It is also possible to display the results enlarged display screen 1402 or the anomaly diagnosis result display screen 1403 by the switching tabs. When confirmation is finished, by pressing the end button 1411, it returns to the display of the recipe setting screen 1301.

By pressing the registration button 1315, the information stored in association with the test number being displayed in the test number display window 1313 is registered in association with the recipe name, it finishes. If the cancel button 1316 is pressed, it finishes with saving nothing.

Also, if the test result list button 1317 is pressed, as shown in FIG. 15, the test result list display screen 1501 is displayed. In the test result list 1502, recipe information, such as the learning period, the test period, the selected sensor number, the reference creation parameters, and threshold configuration parameter, and threshold value, the test result information, such as abnormal number of sections of all tests are displayed. There is selection check buttons on the left end of the list; it is possible to select only one of them. By pressing the detailed display button 1503, loading the information stored in association with the recipe name and test number, the entire result display screen 1401 is displayed. It is also possible to display the enlarged result display screen 1402 or the anomaly diagnosis result display screen 1403 by the switching tabs. When confirmation finishes, by pressing the end button 1411, it returns to the display of the test result list display screen 1501. By pressing the registration button 1504, registering the information stored in association with the test number being selected in association with the recipe name, the display of the test result list display screen 1501 and the recipe setting screen 1301 is finished. If the back button 1505 is pressed, it returns to display of the recipe setting screen 1301 without registration of recipes.

Registered recipe is managed with labels of active or inactive; for the newly observed data; by using the information of the active recipe matching device ID, performing the processes of extracting one of the feature vectors explained with reference to FIGS. 7 to 11, detecting anomaly and identifying the related sensor, processing is performed, the result is stored in association with the recipe name.

Figure 16:
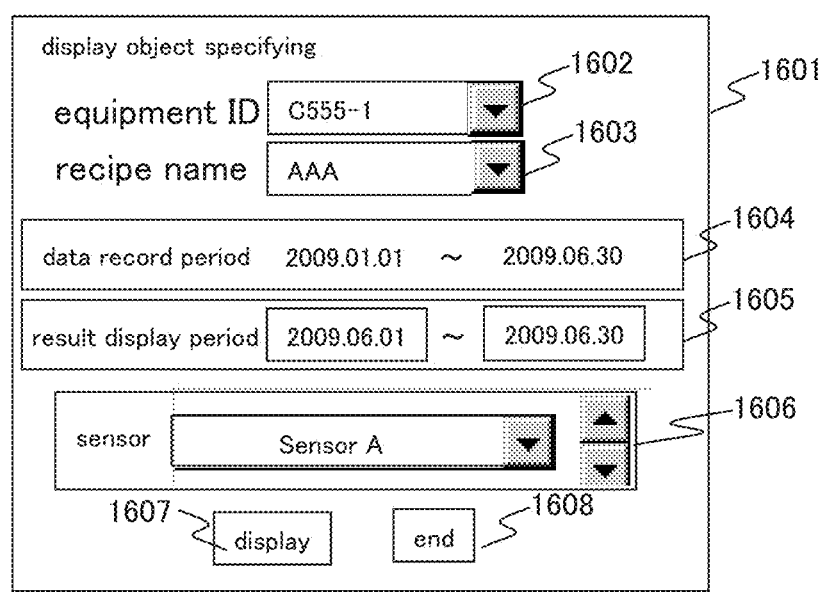
FIG. 16 is a front view of a display screen showing an example of a GUI for designating the results to be displayed.

The example of a GUI to show the result of the anomaly detection diagnosis processing to the user is shown in FIG. 16.

FIG. 16 is an example of a GUI to specify a display object. The recipe, the period and the equipment of display object are specified from the display object specifying screen 1601. At the beginning, the device ID is selected by the device ID selection window 1602. Next, by the recipe name selection window 1603, a recipe to be displayed is chosen from the list of recipes to device ID. In the data recording period display unit 1604, the start date and the end date of the period when processes are performed by the recipe and the record is left is displayed. In the result display period specifying window 1605, the start date and the end date of the period for which a user wants to display the results is entered. In the display sensor specified window 1606, the name of the sensor a user wants to display is entered. The entire result display screen 1401 shown in FIG. 14A is displayed by pressing the display button 1607. It finishes by pressing the end button 1608.

Figure 17:
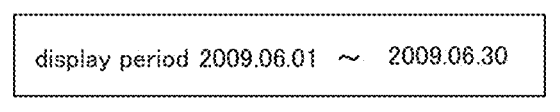

Because the screen and operation of the GUI relating to the result display is substantially the same as the GUI related to the test result display shown in FIGS. 14A-14C, only the different parts will be described. As the display window corresponding to the period display window 1404 in the entire result display screen 1401 and the enlarged result display screen 1402, the display period specified in the result display period specifying window 1605 as shown in FIG. 17 is displayed. In the screen corresponding to the entire result display screen 1401, in the window corresponding to the anomaly measure display window 1405, the anomaly measure, the threshold value and the determination result in the specified display period are displayed. In the window corresponding to the sensor signals displaying window 1406, the output value of the sensor specified by the sensor specifying display window 1606 in the specified period is displayed. It is possible to change the displayed sensors, by inputting to the window corresponding to the sensor name selection window 1408.

In the above embodiments, learning data setting is processed offline, diagnostic process are performed in real-time, and displaying result is processed online; it may also be possible to process displaying of result in real-time. In that case, the length of the display period, the recipe to be a display object, and information to be displayed and previously determined; it may be configured to display the latest information every predetermined time.

Conversely, what setting any period, selecting a recipe, adding a function of the anomaly diagnosis processing offline is also included in the scope of the present invention.

According to this embodiment, it is possible to calculate a highly accurate anomaly measure even for equipment in which the state changes complexly. Also, it is possible to suppress the occurrence of false alarms.

Furthermore, according to this embodiment, even when data obtained from the signal of the normal sensor is affected by the data of the signal of the abnormal sensor; it becomes possible to diagnose the sensors related to the detected anomaly correctly.

Also, because a 2-dimensional feature distribution density obtained as a result of examination is displayed in the image, identifying the anomaly-related sensors becomes easy. Furthermore, it becomes possible to check the tendency of the distribution of the learning data on the screen.

Embodiment 2

An embodiment of a method for anomaly diagnosis based on the sensor signals output from the facility has been described above, as another example, further; a method of anomaly diagnosis by using the sensor signals and also the event signal output from the facility will be described.

Figure 18:
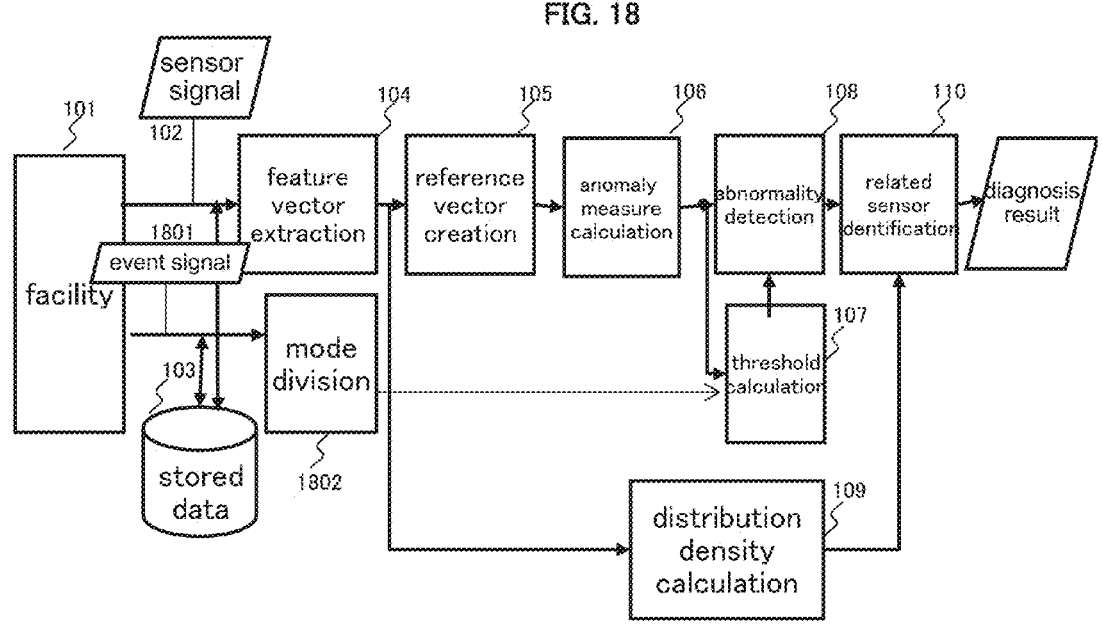
FIG. 18 is a block diagram showing a schematic configuration of equipment condition monitoring system of an embodiment 2 of the present invention.

A second embodiment of a system for implementing the anomaly diagnostic method of the present invention is shown in FIG. 18. Structure of this embodiment is structure shown in FIG. 1 described in Example 1 to which the mode division unit 1802 is added. The same numbers are given for the same configuration as embodiment 1. Mode division unit 1802, inputting an event signal 1801 from the facility, divides the mode representing the operating state of equipment on the basis of the event signal 1801. The result of the mode division is input to the threshold value calculation unit 107'; the processing flow as described in FIG. 5 is performed for each divided mode and threshold setting in step S511 is performed for each mode.

Processing flow as described in FIG. 7 is also performed for each divided mode; the anomaly determination of the step S707 in the anomaly detecting unit 108' is performed using a threshold value of the corresponding mode. Also, enter the result of the distribution density calculation unit 109' performs mode division, performs creation of distribution density images for each mode, and performs processes of sensor specification in the related sensor identification unit 110' for each mode.

Figures 19A, 19B, 19C:
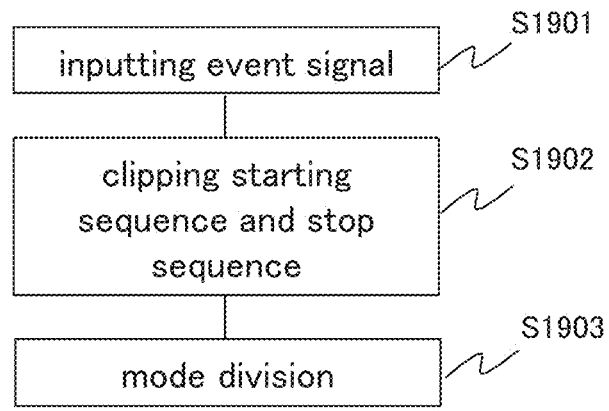
FIG. 19A is a table of the signal list showing an example of an event signal relating to embodiment 2 of present invention.
FIG. 19B is a flow diagram showing a flow of mode division processes based on an event signal relating to embodiment 2 of present invention.
FIG. 19C is a schematic diagram of the event signal indicating the operating condition of the equipment being divided and classified into one of four equipment mode, relating to embodiment 2 of present invention.

Other than the above, since all are the same as the method described in the Embodiment 1 above, an embodiment of a mode division methods based on event signal different from the Embodiment 1 will be described with reference to FIGS. 19A-19C. An example of an event signal is shown in FIG. 19A. List 1920 shown in FIG. 19A is a signal of equipment representing the operation, the malfunction and the warning output irregularly, configuring the time and character string or code representing operation, malfunction and warning.

As shown in FIG. 19B, entering this event signal to the mode division unit 1802 (S1901), clipping of starting sequence and stop sequence is performed by searching a predetermined character string or code (S1902). Based on the result, the event signal is divided into the four operating state of "steady OFF" mode 1911 from the end time of the stop sequence to the start time of the start-up sequence, "starting" mode 1912 during the start-up sequence, "steady ON" mode 1913 from the end time of the start-up sequence to the start time of the stop sequence, and "stop" mode 1914 during stop sequence (S1903). An example is shown in FIG. 19C.

For clipping sequence, specifying a start event and an end event of sequence in advance, the event signal from the start to the end is clipped out while scanning in the following manner.

(1) In the case not in the middle of sequence, to explore the start event. To start the sequence if found.
(2) In the case in the middle of sequence, to explore the end event. The end sequence if found. The end events here are malfunction, warning, and the specified start event other than the specified end event.

As described above, by utilizing an event signal, diverse operating state can be divided exactly; by setting the threshold value for each mode, in transition of "start" mode 1912 and "stop" mode 1914, even if it is necessary to drop the sensitivity by lack of learning data, it is possible to perform sensitive anomaly detection in "steady OFF" mode 1911 and "steady ON" mode 1913.

That is, according to this embodiment, it is possible to set the threshold in response to various operating state of the equipment, to allow high sensitivity anomaly detection, and to diagnose the detected anomaly-related sensors correctly. Moreover, by calculating the distribution density of the learning data for each mode, because data of different states is not included, the diagnosis becomes facilitated and understanding of the distribution density image becomes facilitated.

REFERENCE SIGNS LIST

101 . . . equipment 102 . . . sensor signal 103 . . . sensor signal storage unit 104 . . . feature vector extraction unit 105 . . . reference vector calculating unit 106 . . . anomaly measure calculating unit 107 . . . threshold calculating unit 108 . . . anomaly detection unit 109 . . . distribution density calculating unit 110 . . . related sensor identification unit 1301 . . . recipe setting screen 1401 . . . the entire result display screen 1402 . . . enlarged result display screen 1403 . . . anomaly diagnosis result display screen 1501 ... test result list display screen 1601 ... display object specifying screen 1801 ... events signal 1802 ... mode division unit.

The invention claimed is:

1. A computer-implemented method for diagnosing an anomaly of a plurality of equipment or device based on sensor signals output from a plurality of sensors mounted on the equipment or apparatus, the method comprising the steps of:
   obtaining, using at least one processor, multi-dimensional feature vectors from feature values of a plurality of sensor signals in pre-specified learning period;
   extracting, using the at least one processor, the multi-dimensional feature vectors for each time from feature values of a plurality of sensor signals at the time of diagnosis;
   calculating, using the at least one processor, reference feature vectors for each time based on the set of the multi-dimensional feature vectors obtained in the pre-specified learning period and on the multi-dimensional feature vector extracted at the each time of diagnosis;
   calculating, using the at least one processor, the anomaly measure based on difference between the multi-dimensional feature vector extracted at each time and the reference feature vector for each time;
   detecting, using the at least one processor, an anomaly by comparing the calculated anomaly measure with a predetermined threshold; and;
   identifying, using the at least one processor, a sensor, from a plurality of sensors, relating to the detected anomalies based on 2-dimensional distribution density of the feature values of a plurality of sensor signals in the time when anomaly was detected.

2. The method for diagnosing according to claim 1, wherein the predetermined threshold is calculated based on the anomaly measure of pre-specified learning period.

3. A computer-implemented method for diagnosing an anomaly of an equipment comprising:
   creating and storing in memory, using at least one processor, learning data based on multiple sensor signals output from a plurality of sensors mounted on equipment or apparatus; and
   performing, using the at least one processor, anomaly diagnosis of a plurality of sensor signals output from the plurality of sensors mounted the equipment or the apparatus,
   wherein the creating and storing a learning data comprises:
   extracting, using the at least one processor, a feature vector from the plurality of sensor signals;
   storing, using the at least one processor, in memory the extracted feature vector as learning data;
   selecting, using the at least one processor, a predetermined number of a feature vector from the learning data stored in accordance with the feature vectors in each of the stored feature vectors as learning data;
   creating, using the at least one processor, a reference vector for learning by using the selected predetermined number of the feature vectors;
   calculating, using the at least one processor, an anomaly measure in each of the feature vectors stored as learning data based on the created reference vectors for learning;
   calculating, using the at least one processor, a threshold value based on the calculated anomaly measure;
   calculating, using the at least one processor, the 2-dimensional feature distribution density of all combinations from the feature vector;
   performing, using the at least one processor, of anomaly diagnosis of the sensor signal comprises;
   extracting, using the at least one processor, feature vectors as observation vectors from a plurality of sensor signals output from the plurality of sensors mounted on the equipment or apparatus;
   selecting, using the at least one processor, a predetermined number of the feature vectors from the learning data stored in accordance with the extracted observation vector;
   creating, using the at least one processor, a reference vector for anomaly diagnosis using the predetermined number of the selected feature vector;
   calculating, using the at least one processor, the anomaly measure of observation vectors on the basis of the created reference vector for anomaly diagnosis;
   determining, using the at least one processor, whether the observation vector is abnormal or normal based on the calculated anomaly measure and the calculated threshold value calculated in the storing and creating of the learning data; and
   identifying, using the at least one processor, anomaly-related sensors based on the observation vector at the time when a sensor signal corresponding to an observation vector determined to be abnormal is detected and on the 2-dimensional feature distribution density.

4. The anomaly diagnostic method according to claim 3, wherein Local Subspace Classifier is utilized both in the creating of the reference vector for the learning, and the creating of the reference vector for the anomaly diagnosis.

5. The anomaly diagnosis method according to claim 3, wherein the 2-dimensional feature distribution density calculated in the creating and storing of the learning data, is calculated, using the at least one processor, based on the 2-dimensional frequency distribution feature of the set of feature vectors and, is converted, using the at least one processor, to grayscale image and stored.

6. The anomaly diagnosis method according to claim 3, wherein the identifying of the anomaly-related sensors in the performing anomaly diagnosis of the sensor signal, includes:
   calculating, using the at least one processor, a difference between the observed value and the reference value based on the reference vector and the observation vector;
   associating, using the at least one processor, a sensor in which the calculated difference is the maximum as the first related sensor; and
   associating, using the at least one processor, a sensor in which the density of the value corresponding to the observation vector is a minimum, constituting a feature as a pair of the first sensors, based on the 2-dimensional feature distribution density according to the first related sensor, as second related sensor.

7. The anomaly diagnosis method according to claim 3, wherein the identifying of the anomaly-related sensors in the performing of anomaly diagnosis of the sensor signal, includes:
   calculating, using the at least one processor, density of value corresponding to the observing vector based on the 2-dimensional feature distribution density;
   associating, using the at least one processor, a sensor in which the sum of the calculated density is the minimum as the first related sensor; and associating, using the at least one processor, a sensor in which the density of the value corresponding to the observation vector is a minimum, constituting a feature as a pair of the first related sensor, based on the 2-dimensional feature distribution density according to the first related sensor, as second related sensor.

8. The anomaly diagnosis method according to claim 6, wherein the identifying of the anomaly-related sensors in the performing of anomaly diagnosis of the sensor signal, includes:

calculating, using the at least one processor, a 2-dimensional partial feature distribution density of all combinations except the first related sensors, using data close to an observation vector in which the first related sensor signal is determined to be abnormal among the learning data on the basis of the 2-dimensional partial feature distribution density except for that of the first related sensor;

calculating, using the at least one processor, density of value corresponding to the observation vector on the basis of the 2-dimensional partial feature distribution density, associating, using the at least one sensor, a sensor in which the sum of the calculated density is the minimum as the second related sensor; and associating, using the at least one processor, a sensor in which the density of the value corresponding to the observation vector is a minimum, constituting a feature as a pair of the second related sensor, based on the 2-dimensional feature distribution density according to the second related sensor, as third related sensor.

9. The anomaly diagnosis method according to claim 3, wherein the identifying of the anomaly-related sensors in the performing of anomaly diagnosis of the sensor signal, includes:

identifying, using the at least one processor, a section in which the anomaly detected in succession;

a step for calculating, using the at least one processor, a sum of the absolute value of the difference between the observed value and the reference value based on the observed vector and the reference vector for observation vectors included in the section;

associating, using the at least one processor, a sensor in which the calculated sum is the maximum as the first related sensor;

calculating, using the at least one processor, the sum of density of values corresponding to the observation vector and the number of times in which the density is non-zero; and associating, using the at least one processor, a sensor in which the calculated number of times and the calculated sum are minimum, constituting a feature as a pair of the first related sensor, based on the 2-dimensional feature distribution density according to the first related sensor, as second related sensor.

10. The anomaly diagnosis method according to claim 3, further comprising:

displaying, using the at least one processor, on a display screen an image which the point corresponding to the observation vector determined to be abnormal is plotted superimposed in a time series graph of the anomaly measure, the threshold value and the determinant result, in a time series graph of the sensor signal output from the sensor related with the identified anomaly and in the image representing the distribution density of 2-dimensional features of the learning data.

11. A computer-implemented method for diagnosing anomaly of equipment and an apparatus comprising:

creating and storing in memory, using at least one processor, learning data based on the plurality of sensor signals output from the plurality of sensors mounted on the equipment or the apparatus; and performing, using the at least one processor, anomaly diagnosis of a plurality of sensor signals newly output from a plurality of sensors mounted on the equipment or the apparatus, wherein the creating and storing of the learning data includes:

performing, using the at least one processor, a mode division into different operating state based on the event signal output from the equipment or apparatus;

extracting, using the at least one processor, feature vectors from a plurality of sensor signals;

storing in memory, using the at least one processor, the extracted feature vector as the learning data;

selecting, using the at least one processor, a predetermined number of feature vectors from the learning data in accordance with each feature vector stored as learning data;

creating, using the at least one processor, a reference vector for learning by using a predetermined number of the selected feature vectors;

calculating, using the at least one processor, an anomaly measure of the feature vectors stored as learning data based on the created reference vector for learning;

calculating, using the at least one processor, a threshold value for each mode based on the calculated anomaly measure; and calculating, using the at least one processor, the 2-dimensional feature distribution density of combinations for mode from the feature vectors stored as learning data, and wherein the performing of anomaly diagnosis of a plurality of sensor signals includes:

extracting, using the at least one processor, a feature vector as an observation vector from the plurality of signals output from the plurality of sensors mounted on the equipment or apparatus;

selecting, using the at least one processor, a predetermined number of the feature vectors from among the learning data stored in accordance with the extracted observation vector;

creating, using the at least one processor, a reference vector for anomaly diagnosis by using a predetermined number of the feature vector selected from among the learning data;

calculating, using the at least one processor, the anomaly measure of observation vector based on the created reference vector for anomaly diagnosis;

determining, using the at least one processor, whether the observation vector is abnormal or normal based on the calculated anomaly measure, divided mode and the threshold calculated for each divided mode; and identifying, using the at least one processor, anomaly-related sensors based on the observation vector at the time when the sensor signal corresponding to the observation vector determined to be abnormal is detected and the 2-dimensional feature distribution density calculated by each mode.

12. An apparatus for diagnosing anomaly of equipment and an apparatus based on sensor signals output from a plurality of sensors mounted on the equipment or apparatus comprising:

memory, wherein the memory stores at least the sensor signals;

at least one processor for executing stored instructions to:

extract a feature vector from the feature value of the sensor signals;

calculate a reference vector based on set of the feature vectors extracted from the feature value in the pre-specified learning period and the feature vectors extracted from the feature value at each time;

calculate anomaly measure based on the difference between the reference feature vector and the feature vector;

calculate threshold value based on the anomaly measure in the pre-specified learning period;

detect anomaly by comparing the anomaly measure with the threshold value;

calculate 2-dimensional distribution density of the feature value in the pre-specified learning period; and identify anomaly-related sensors based on 2-dimensional distribution density of the feature value at the time when a sensor signal corresponding to the anomaly is detected.

13. An apparatus for diagnosing anomaly of equipment and an apparatus based on sensor signals and event signals output from a plurality of sensors mounted on the equipment or apparatus comprising:

memory, wherein the memory stores at least the sensor signals;

at least one processor for executing stored instructions to:

perform mode division based on the event signals in each operation state;

extract a feature vector from the feature value of the sensor signals;

calculate a reference vector based on set of the feature vectors extracted from the feature value in the pre-specified learning period and the feature vectors extracted from the feature value at each time;

calculate anomaly measure based on the difference between the reference feature vector and the feature vector;

calculate threshold value based on the anomaly measure in the pre-specified learning period at a plurality of modes divided;

detect anomaly by comparing the anomaly measure with the threshold value at a plurality of modes;

calculate 2-dimensional distribution density of the feature value in the pre-specified learning period at a plurality of modes; and identify anomaly-related sensors based on 2-dimensional distribution density of the feature value at the time when a sensor signal corresponding to the mode is detected.

* * * * *